(12) United States Patent
Zhang et al.

(10) Patent No.: US 11,758,504 B2
(45) Date of Patent: Sep. 12, 2023

(54) SELECTION METHOD, SELECTION DEVICE, MANAGEMENT FUNCTION ENTITY, ACCESS NETWORK NODE, GMLC AND NRF

(71) Applicant: DATANG MOBILE COMMUNICATIONS EQUIPMENT CO., LTD., Beijing (CN)

(72) Inventors: Dajun Zhang, Beijing (CN); Ming Ai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 287 days.

(21) Appl. No.: 17/277,178

(22) PCT Filed: Aug. 30, 2019

(86) PCT No.: PCT/CN2019/103635
§ 371 (c)(1),
(2) Date: Mar. 17, 2021

(87) PCT Pub. No.: WO2020/057344
PCT Pub. Date: Mar. 26, 2020

(65) Prior Publication Data
US 2022/0007326 A1 Jan. 6, 2022

(30) Foreign Application Priority Data

Sep. 18, 2018 (CN) .......................... 201811088316.5

(51) Int. Cl.
*H04W 24/00* (2009.01)
*H04W 64/00* (2009.01)
*H04W 72/543* (2023.01)

(52) U.S. Cl.
CPC ....... *H04W 64/003* (2013.01); *H04W 64/006* (2013.01); *H04W 72/543* (2023.01)

(58) Field of Classification Search
CPC ............. H04W 64/003; H04W 72/543; H04W 64/006
See application file for complete search history.

(56) References Cited

U.S. PATENT DOCUMENTS

2015/0201365 A1 7/2015 Chan
2018/0098279 A1 4/2018 Edge
(Continued)

FOREIGN PATENT DOCUMENTS

CN 101232700 A 7/2008
CN 101730064 A 6/2010
(Continued)

OTHER PUBLICATIONS

"Consideration on Supporting Local LMF in NR Positioning R16", R2-1816955, 3GPP TSG RAN WG2 Meeting #104, Spokane, USA, Nov. 12-16, 2018, all pages.
(Continued)

*Primary Examiner* — Justin Y Lee
(74) *Attorney, Agent, or Firm* — Ladas & Parry, LLP

(57) ABSTRACT

The present disclosure provides a selection method, a selection device, a management function entity, an access network node, a GMLC and a NRF. The selection method of a location management function entity includes: receiving a positioning request message sent by a GMLC; the positioning request message including an identifier of a target UE and a positioning QOS requirement; obtaining information of a wireless access network where the target UE is located; selecting a target LLMF entity according to the information of the wireless access network where the target UE is located, the positioning QOS requirement, and pre-stored related information of the LLMF entity.

20 Claims, 10 Drawing Sheets

(56) References Cited

U.S. PATENT DOCUMENTS

| | | | |
|---|---|---|---|
| 2018/0199160 A1 | 7/2018 | Edge | |
| 2020/0053686 A1* | 2/2020 | Edge | H04W 52/0229 |
| 2020/0092776 A1* | 3/2020 | Edge | H04W 8/08 |

FOREIGN PATENT DOCUMENTS

| | | |
|---|---|---|
| CN | 105874829 A | 8/2016 |
| WO | 2018129337 A1 | 7/2018 |

OTHER PUBLICATIONS

"Study on enhancement to the 5GC location services", R2-1817723, 3GPP TSG-RAN WG2 #104, Spokane, USA, Nov. 12-Nov. 16, 2018, all pages.

"Considerations on NR positioning architecture enhancement", R3-190570, 3GPP TSG-RAN WG3 #103, Athens, Greece, Feb. 25-Mar. 1, 2019, all pages.

"Solution for Local LCS architecture", S2-1811186, SA WG2 Meeting #129, Oct. 15-19, 2018, Dongguan, P. R. China, all pages.

International Search Report from PCT/CN2019/103635, dated Nov. 27, 2019, with English translation from WIPO, all pages.

Written Opinion of the International Searching Authority from PCT/CN2019/103635, dated Nov. 27, 2019, with English translation from WIPO, all pages.

International Preliminary Report on Patentability from PCT/CN2019/103635, dated Mar. 23, 2021, with English translation from WIPO, all pages.

First Office Action and search report from CN app. No. 201811088316.5, dated Jul. 27, 2020, with English translation from Global Dossier, all pages.

3rd Generation Partnership Project; Technical Specification Group Services and System Aspects; Study on Enhancement to the 5GC Location Services (Release 16), 3GPP TR 23.731 V0.6.0, Aug. 2018, all pages.

* cited by examiner after receiving a UE context acquisition response message fed back by a unified data management UDM entity, sending a positioning request message to the first management function entity    /71

Fig. 7 confirming and accepting a registration process initiated by a first management function entity or a second management function entity, and registering network function NF configuration information of a local location management function LLMF    /81

SELECTION METHOD, SELECTION DEVICE, MANAGEMENT FUNCTION ENTITY, ACCESS NETWORK NODE, GMLC AND NRF

CROSS-REFERENCE TO RELATED APPLICATIONS

The present application is the U.S. national phase of PCT Application No. PCT/CN2019/103635 filed on Aug. 30, 2019, which claims a priority of to the Chinese patent application No. 201811088316.5 filed on Sep. 18, 2018, the disclosures of which are incorporated herein by reference in their entireties.

TECHNICAL FIELD

The present disclosure relates to the field of communication technology, in particular to a selection method, a selection device, a management function entity, an access network node, GMLC and NRF.

BACKGROUND

Location Based Services (LBS) is a service that obtains UE location information through wireless communication networks or other location systems, and then combines various location-related information provided by geographic information systems to users. Outdoor positioning technology based on the Global Navigation Satellite System (GNSS) has been widely used in various fields. In addition, the high-precision positioning technology based on the 4G mobile communication network has also effectively filled the gap in the positioning of the satellite navigation system. The mobile communication network has entered the era of 5G technology, so it is necessary to study a more concise and efficient 5G positioning network architecture. Compared with the 4G LTE (long-term evolution) architecture, this 5G positioning network architecture should have positioning demand of higher precision and lower latency.

(1) 5G Mobile Communication System

In the 5G system, most of the nodes on the network side are wiredly connected, that is, the gNBs (NR NodeB, 5G base station) are connected to each other through a wired link, and the gNB and the core network node, such as Access and Mobility Management Function (AMF), User Plane Function (UPF), etc., are connected by a wired link.

Ng-eNB (4G base station node that can access core network 5GC): node providing E-UTRA user plane and control plane protocol terminations towards the UE, and connected via the NG interface to the 5GC. Specifically, as shown in FIG. 1, Xn represents an Xn interface, NG represents an NG interface, and NG-RAN represents a radio access network.

(2) 5G Wireless Protocol Architecture

The 5G basic user plane protocol layer includes service discovery application specification layer SDAP, packet data convergence protocol layer PDCP, radio link layer RLC and medium access control layer MAC, and physical layer PHY. The control plane protocol layer includes non-access layer NAS, radio resource control layer RRC, PDCP, RLC, MAC and PHY. Specifically, the protocol stack architecture of the user plane and the control plane is shown in FIG. 2.

(3) A 5G Location Network Architecture

As shown in FIG. 3, it shows a service-based location service network architecture, where location management function entity (LMF) has the following functions: supporting location calculation, obtaining downlink location measurement results or location estimates from the UE, and obtaining uplink location measurement results from the Radio Access Network (RAN) side, and obtaining auxiliary data from the RAN side. In the drawing, N1 represents the N1 interface (also can be understood as the logical interface between the UE and AMF), N2 represents the N2 interface, NLs represents the NLs interface, NLg represents the NLg interface, NLh represents the NLh interface, Le represents the Le interface, and UDM represents the unified data management entity, GMLC represents the gateway mobile location center entity, LRF represents the location acquisition function entity, and External Client represents the external client.

In the related art, the location management function entity is located in the 5G core network. In order to complete one positioning service, the required information transmission process is: AMF→LMF (LPP, a peer layers positioning protocol between the UE and the positioning server)→AMF (NAS)→RAN→UE (terminal), followed by UE→RAN→AMF (NAS)→LMF (LPP)→AMF. By considering the transmission delay and processing delay, such a processing flow will undoubtedly increase the overall delay requirement of the location service.

SUMMARY

The present disclosure provides a selection method, a selection device, a management function entity, an access network node, a GMLC and a NRF, so as to solve the problem that the positioning management scheme increase the whole delay requirement of the positioning service.

In order to solve the above technical problem, an embodiment of the present disclosure provides a selection method of a location management function entity, applied to a first management function entity, includes: receiving a positioning request message sent by a gateway mobile location center (GMLC); the positioning request message including an identifier of a target user equipment (UE) and a positioning quality of service (QOS) requirement; obtaining information of a wireless access network where the target UE is located; selecting a target local location management function (LLMF) entity according to the information of the wireless access network where the target UE is located, the positioning QOS requirement, and pre-stored related information of the LLMF entity.

Optionally, the pre-stored related information of the LLMF entity is obtained by querying a network repository function (NRF) entity.

Optionally, the first management function entity is an access and mobility management function (AMF) entity or a mobility management entity (MME).

Optionally, the obtaining information of the wireless access network where the target UE is located includes: if the target UE is in a disconnected state, initiating a service session process to the target UE according to an identifier of the target UE, so that the target UE enters a connected state, and the information of the wireless access network where the target UE is located is obtained.

Optionally, the first management function entity is a location management function (LMF) entity.

Optionally, the positioning request message further includes address information of the AMF entity or the MME; the obtaining the information of the wireless access network where the target UE is located includes: sending an enable UE reachability request message to the AMF entity or the MME according to the address information, wherein the enable UE reachability request message carries the identifier of the target UE; receiving an enable UE reachability response message fed back by the AMF entity or the MME according to the enable UE reachability request message; wherein the enable UE reachability response message carries the information of the wireless access network where the target UE is located; the selecting the target LLMF entity according to the information of the wireless access network where the target UE is located, the positioning QOS requirement, and the pre-stored related information of the LLMF entity includes: querying the pre-stored related information of the LLMF entity from a unified data management (UDM) entity according to the information of the wireless access network where the target UE is located; selecting the target LLMF entity according to the positioning QOS requirement and the queried pre-stored related information of the LLMF entity.

Optionally, after selecting the target LLMF entity, the selection method further includes: sending a positioning request message to an access network node including the target LLMF entity; receiving a positioning result fed back by the access network node according to the positioning request message, and sending the positioning result to the GMLC.

Optionally, when the first management function entity is the AMF entity or the MME, the sending a positioning request message to the access network node including the target LLMF entity includes: sending the positioning request message to the access network node including the target LLMF entity via a network interface.

Optionally, when the first management function entity is a location management function (LMF) entity, the sending a positioning request message to the access network node including the target LLMF entity includes: sending the positioning request message to the access network node including the target LLMF entity through a newly added network interface.

Optionally, before selecting the target LLMF entity according to the information of the wireless access network where the target UE is located, the positioning QOS requirement, and the pre-stored related information of the LLMF entity, the selection method further includes: receiving a first interface setting request message sent by the access network node; wherein the first interface setting request message explicitly or implicitly indicates that the access network node includes the LLMF entity; storing related information of the LLMF entity carried in the first interface setting request message; and feeding back a first interface setting response message to the access network node according to the first interface setting request message; wherein the first interface is an NG interface or an S1 interface.

Optionally, after feeding back the first interface setting response message to the access network node, the selection method further includes: initiating a registration process for the NRF entity, and notifying the NRF entity of network function (NF) configuration information of the LLMF entity; wherein the NF configuration information at least includes radio access network (RAN) identification information corresponding to the LLMF entity.

Optionally, the RAN identification information includes at least one of the following information: identity of the access network node; IP address of the LLMF entity; identification ID of the LLMF entity.

Optionally, the indicating that the access network node includes the LLMF entity includes at least one of the following conditions: carrying local positioning function indication information; carrying identity information of the LLMF entity; carrying IP address information of the LLMF entity; carrying positioning capability information of the LLMF entity.

An embodiment of the present disclosure provides a selection method of a location management function entity, applied to a second management function entity, which is an access and mobility management function (AMF) entity or a mobility management entity (MME), includes: receiving an enable UE reachability request message sent by a first management function entity; wherein the first management function entity is a location management function (LMF) entity; feeding back an enable UE reachability response message to the first management function entity according to the enable UE reachability request message, wherein the enable UE reachability response message carries information of a wireless access network where a target user equipment (UE) is located.

Optionally, the feeding back an enable UE reachability response message to the first management function entity according to the enable UE reachability request message includes: if the target UE is in a disconnected state, initiating a service session process to the target UE according to an identifier of the target UE, so that the target UE enters a connected state, and information of the wireless access network where the target UE is located is obtained; feeding back an enable UE reachability response message to the first management function entity according to the information of the wireless access network where the target UE is located.

Optionally, before receiving an enable UE reachability request message sent by a first management function entity, the selection method further includes: receiving a first interface setting request message sent by an access network node; wherein the first interface setting request message explicitly or implicitly indicates that the access network node includes a local location management function (LLMF) entity; storing related information of the LLMF entity carried in the first interface setting request message, and feeding back a first interface setting response message to the access network node according to the first interface setting request message; wherein the first interface is an NG interface or an S1 interface.

Optionally, after feeding back the first interface setting response message to the access network node, the selection method further includes: initiating a registration process for a network repository function (NRF) entity, and notifying the NRF entity of network function (NF) configuration information of the LLMF entity; wherein the NF configuration information at least includes radio access network (RAN) identification information corresponding to the LLMF entity.

Optionally, the RAN identification information includes at least one of the following information: identity of the access network node; IP address of the LLMF entity; identification ID of the LLMF entity.

Optionally, the indicating that the access network node includes the LLMF entity includes at least one of the following conditions: carrying local positioning function indication information; carrying identity information of the LLMF entity; carrying IP address information of the LLMF entity; carrying positioning capability information of the LLMF entity.

An embodiment of the present disclosure provides a selection method of a location management function entity, applied to an access network node including a local location management function (LLMF) entity, includes: receiving a positioning request message sent by a first management function entity; performing a positioning service according to the positioning request message to obtain a positioning result; feeding back the positioning result to the first management function entity.

Optionally, the first management function entity is an access and mobility management function (AMF) entity or a mobility management entity (MME), the receiving a positioning request message sent by a first management function entity includes: receiving the positioning request message sent by the first management function entity via a network interface.

Optionally, the first management function entity is a location management function (LMF) entity, the receiving a positioning request message sent by a first management function entity includes: receiving the positioning request message sent by the first management function entity through a newly added network interface.

Optionally, when the first management function entity is an access and mobility management function (AMF) entity or a mobility management entity (MME), before receiving a positioning request message sent by a first management function entity, the selection method further includes: sending a first interface setting request message to the first management function entity; receiving a first interface setting response message fed back by the first management function entity according to the first interface setting request message; wherein the first interface setting request message explicitly or implicitly indicates that the access network node includes the LLMF entity; the first interface is an NG interface or an S1 interface.

Optionally, when the first management function entity is the LMF entity, before receiving a positioning request message sent by a first management function entity, the selection method further includes: sending a first interface setting request message to a second management function entity; receiving a first interface setting response message fed back by the second management function entity according to the first interface setting request message; wherein the second management function entity is an access and mobility management function (AMF) entity or a mobility management entity (MME); the first interface setting request message explicitly or implicitly indicates that the access network node includes the LLMF entity; the first interface is an NG interface or an S1 interface.

Optionally, the indicating that the access network node includes the LLMF entity includes at least one of the following conditions: carrying local positioning function indication information; carrying identity information of the LLMF entity; carrying IP address information of the LLMF entity; carrying positioning capability information of the LLMF entity.

An embodiment of the present disclosure provides a selection method of a location management function entity, applied to a gateway mobile location center (GMLC), includes: after receiving a user equipment (UE) context acquisition response message fed back by a unified data management (UDM) entity, sending a positioning request message to the first management function entity; wherein the positioning request message includes an identifier of a target UE and a positioning quality of service (QOS) requirement.

Optionally, when the first management function entity is an access and mobility management function (AMF) entity or a mobility management entity (MME), after receiving a UE context acquisition response message fed back by a UDM entity, the sending a positioning request message to the first management function entity includes: receiving a UE context acquisition response message fed back by the UDM entity, the UE context acquisition response message includes address information of the AMF entity or the MME; sending a positioning request message to the AMF entity or the MME according to the address information of the AMF entity or the MME.

Optionally, when the first management function entity is a location management function (LMF) entity, after receiving a UE context acquisition response message fed back by a UDM entity, the sending a positioning request message to the first management function entity includes: receiving a UE context acquisition response message fed back by the UDM entity, the UE context acquisition response message includes address information of the LMF entity and address information of the AMF entity or the MME; and sending the positioning request message to the LMF entity according to the address information of the LMF entity.

An embodiment of the present disclosure provides a selection method of a location management function entity, applied to a network repository function (NRF) entity, includes: confirming and accepting a registration process initiated by a first management function entity or a second management function entity, and registering network function (NF) configuration information of a local location management function (LLMF) entity; wherein the first management function entity is an access and mobility management function (AMF) entity or a mobility management entity (MME); the second management function entity is the AMF entity or the MME; the NF configuration information at least includes radio access network (RAN) identification information corresponding to the LLMF entity.

Optionally, the RAN identification information includes at least one of the following information: identity of the access network node; IP address of the LLMF entity; identification ID of the LLMF entity.

An embodiment of the present disclosure provides a first management function entity, comprising a memory, a processor, a transceiver, and a computer program stored in the memory and executed by the processor; wherein the processor executes the program to implement the following steps: receiving a positioning request message sent by a gateway mobile location center (GMLC) through the transceiver; the positioning request message including an identifier of a target user equipment (UE) and a positioning quality of service (QOS) requirement; obtaining information of a wireless access network where the target UE is located; selecting a target local location management function (LLMF) entity according to the information of the wireless access network where the target UE is located, the positioning QOS requirement, and pre-stored related information of the LLMF entity.

Optionally, the pre-stored related information of the LLMF entity is obtained by querying a network repository function (NRF) entity.

Optionally, the first management function entity is an access and mobility management function (AMF) entity or a mobility management entity (MME).

Optionally, the processor is specifically configured to: if the target UE is in a disconnected state, initiate a service session process to the target UE according to an identifier of the target UE, so that the target UE enters a connected state, and the information of the wireless access network where the target UE is located is obtained.

Optionally, the first management function entity is a location management function (LMF) entity.

Optionally, the positioning request message further includes address information of the AMF entity or the MME; the processor is specifically configured to: send an enable UE reachability request message to the AMF entity or the MME according to the address information, wherein the enable UE reachability request message carries the identifier of the target UE; receive an enable UE reachability response message fed back by the AMF entity or the MME according to the enable UE reachability request message; wherein the enable UE reachability response message carries the information of the wireless access network where the target UE is located; the processor is specifically configured to: query the pre-stored related information of the LLMF entity from a unified data management (UDM) entity according to the information of the wireless access network where the target UE is located; select the target LLMF entity according to the positioning QOS requirement and the queried pre-stored related information of the LLMF entity.

Optionally, the processor is further configured to: after selecting the target LLMF entity, send a positioning request message to an access network node including the target LLMF entity through the transceiver; receive a positioning result fed back by the access network node according to the positioning request message, and sending the positioning result to the GMLC.

Optionally, when the first management function entity is the AMF entity or the MME, the processor is specifically configured to: send the positioning request message to the access network node including the target LLMF entity via a network interface.

Optionally, the first management function entity is a location management function (LMF) entity, the processor is specifically configured to: send the positioning request message to the access network node including the target LLMF entity through a newly added network interface.

Optionally, the processor is further configured to: before selecting the target LLMF entity according to the information of the wireless access network where the target UE is located, the positioning QOS requirement, and the pre-stored related information of the LLMF entity, receive a first interface setting request message sent by the access network node through the transceiver; wherein the first interface setting request message explicitly or implicitly indicates that the access network node includes the LLMF entity; store related information of the LLMF entity carried in the first interface setting request message; and feed back a first interface setting response message to the access network node according to the first interface setting request message; wherein the first interface is an NG interface or an S1 interface.

Optionally, the processor is further configured to: after feeding back the first interface setting response message to the access network node, initiate a registration process for the NRF entity, and notify the NRF entity of network function (NF) configuration information of the LLMF entity; wherein the NF configuration information at least includes radio access network (RAN) identification information corresponding to the LLMF entity.

Optionally, the RAN identification information includes at least one of the following information: identity of the access network node; IP address of the LLMF entity; identification ID of the LLMF entity.

Optionally, the indicating that the access network node includes the LLMF entity includes at least one of the following conditions: carrying local positioning function indication information; carrying identity information of the LLMF entity; carrying IP address information of the LLMF entity; carrying positioning capability information of the LLMF entity.

An embodiment of the present disclosure provides a second management function entity, comprising a memory, a processor, a transceiver, and a computer program stored in the memory and executed by the processor; the second management function entity is an access and mobility management function (AMF) entity or a mobility management entity (MME), wherein the processor executes the program to implement the following steps: receiving an enable UE reachability request message sent by a first management function entity; wherein the first management function entity is a location management function (LMF) entity; feeding back an enable UE reachability response message to the first management function entity according to the enable UE reachability request message, wherein the enable UE reachability response message carries information of a wireless access network where a target user equipment (UE) is located.

Optionally, the processor is specifically configured to: if the target UE is in a disconnected state, initiate a service session process to the target UE according to an identifier of the target UE, so that the target UE enters a connected state, and information of the wireless access network where the target UE is located is obtained; feed back an enable UE reachability response message to the first management function entity according to the information of the wireless access network where the target UE is located.

Optionally, the processor is further configured to: before receiving an enable UE reachability request message sent by a first management function entity, receive a first interface setting request message sent by an access network node; wherein the first interface setting request message explicitly or implicitly indicates that the access network node includes a local location management function (LLMF) entity; store related information of the LLMF entity carried in the first interface setting request message, and feed back a first interface setting response message to the access network node according to the first interface setting request message; wherein the first interface is an NG interface or an S1 interface.

Optionally, the processor is further configured to: after feeding back the first interface setting response message to the access network node, initiate a registration process for a network repository function (NRF) entity, and notify the NRF entity of network function (NF) configuration information of the LLMF entity; wherein the NF configuration information at least includes radio access network (RAN) identification information corresponding to the LLMF entity.

Optionally, the RAN identification information includes at least one of the following information: identity of the access network node; IP address of the LLMF entity; identification ID of the LLMF entity.

Optionally, the indicating that the access network node includes the LLMF entity includes at least one of the following conditions: carrying local positioning function indication information; carrying identity information of the LLMF entity; carrying IP address information of the LLMF entity; carrying positioning capability information of the LLMF entity.

An embodiment of the present disclosure provides an access network node, comprising a local location management function (LLMF) entity including a memory, a processor, a transceiver, and a computer program stored on the memory and executed by the processor; the processor executes the program to implement the following steps: receiving a positioning request message sent by a first management function entity through the transceiver; performing a positioning service according to the positioning request message to obtain a positioning result; feeding back the positioning result to the first management function entity.

Optionally, when the first management function entity is an access and mobility management function (AMF) entity or a mobility management entity (MME), the processor is specifically configured to: receive the positioning request message sent by the first management function entity via a network interface.

Optionally, when the first management function entity is a location management function (LMF) entity, the processor is specifically configured to: receive the positioning request message sent by the first management function entity through a newly added network interface.

Optionally, when the first management function entity is an access and mobility management function (AMF) entity or a mobility management entity (MME), the processor is further configured to: before receiving a positioning request message sent by a first management function entity, send a first interface setting request message to the first management function entity through the transceiver; receive a first interface setting response message fed back by the first management function entity according to the first interface setting request message; wherein the first interface setting request message explicitly or implicitly indicates that the access network node includes the LLMF entity; the first interface is an NG interface or an S1 interface.

Optionally, when the first management function entity is the LMF entity, the processor is further configured to: before receiving a positioning request message sent by a first management function entity, send a first interface setting request message to a second management function entity through the transceiver; receive a first interface setting response message fed back by the second management function entity according to the first interface setting request message; wherein the second management function entity is an access and mobility management function (AMF) entity or a mobility management entity (MME); the first interface setting request message explicitly or implicitly indicates that the access network node includes the LLMF entity; the first interface is an NG interface or an S1 interface.

Optionally, the indicating that the access network node includes the LLMF entity includes at least one of the following conditions: carrying local positioning function indication information; carrying identity information of the LLMF entity; carrying IP address information of the LLMF entity; carrying positioning capability information of the LLMF entity.

An embodiment of the present disclosure provides a gateway mobile location center (GMLC), comprising a memory, a processor, a transceiver, and a computer program stored in the memory and executed by the processor; wherein the processor executes the program to implement the following steps: after receiving a user equipment (UE) context acquisition response message fed back by a unified data management (UDM) entity through the transceiver, sending a positioning request message to the first management function entity; wherein the positioning request message includes an identifier of a target UE and a positioning quality of service (QOS) requirement.

Optionally, when the first management function entity is an access and mobility management function (AMF) entity or a mobility management entity (MME), the processor is specifically configured to: receive a UE context acquisition response message fed back by the UDM entity, the UE context acquisition response message includes address information of the AMF entity or the MME; send a positioning request message to the AMF entity or the MME according to the address information of the AMF entity or the MME.

Optionally, when the first management function entity is a location management function (LMF) entity, the processor is specifically configured to: receive a UE context acquisition response message fed back by the UDM entity, the UE context acquisition response message includes address information of the LMF entity and address information of the AMF entity or the MME; and send the positioning request message to the LMF entity according to the address information of the LMF entity.

An embodiment of the present disclosure provides a network storage function (NRF) entity, comprising a memory, a processor, a transceiver, and a computer program stored in the memory and executed by the processor; wherein the processor executes the program to implement the following steps: confirming and accepting a registration process initiated by a first management function entity or a second management function entity, and registering network function (NF) configuration information of a local location management function (LLMF) entity; wherein the first management function entity is an access and mobility management function (AMF) entity or a mobility management entity (MME); the second management function entity is the AMF entity or the MME; the NF configuration information at least includes radio access network (RAN) identification information corresponding to the LLMF entity.

Optionally, the RAN identification information includes at least one of the following information: identity of the access network node; IP address of the LLMF entity; identification ID of the LLMF entity.

An embodiment of present disclosure provides a computer-readable storage medium, on which a computer program is stored, and when the program is executed by a processor, the steps of the selection method of a location management function entity on the first management function entity side are implement; or when the program is executed by the processor, the steps of the selection method of a location management function entity on the second management function entity side are implemented; or when the program is executed by the processor, the steps of the selection method of a location management function entity on the access network node side are implemented; or when the program is executed by the processor, the steps of the selection method of a location management function entity on the GMLC side are implemented; or when the program is executed by the processor, the steps of the selection method of a location management function entity on the network storage function NRF entity side are implemented.

An embodiment of the present disclosure provides a selection device of a location management function entity, applied to a first management functional entity, includes: a first receiving module, configured to receive a positioning request message sent by a gateway mobile location center (GMLC); the positioning request message including an identifier of a target user equipment (UE) and a positioning quality of service (QOS) requirement; a first obtaining module, configured to obtain information of a wireless access network where the target UE is located; a first processing module, configured to select a target local location management function (LLMF) entity according to the information of the wireless access network where the target UE is located, the positioning QOS requirement, and pre-stored related information of the LLMF entity.

Optionally, the first management function entity is an access and mobility management function (AMF) entity or a mobility management entity (MME).

Optionally, the first management function entity is a location management function (LMF) entity.

Optionally, the positioning request message further includes address information of the AMF entity or the MME; the first obtaining module includes: a first sending sub-module, configured to send an enable UE reachability request message to the AMF entity or the MME according to the address information, wherein the enable UE reachability request message carries the identifier of the target UE; a first receiving sub-module, configured to receive an enable UE reachability response message fed back by the AMF entity or the MME according to the enable UE reachability request message; wherein the enable UE reachability response message carries the information of the wireless access network where the target UE is located; the first processing module includes: a first querying sub-module, configured to query the pre-stored related information of the LLMF entity from a unified data management (UDM) entity according to the information of the wireless access network where the target UE is located; a second processing sub-module, configured to select the target LLMF entity according to the positioning QOS requirement and the queried pre-stored related information of the LLMF entity.

Optionally, the selection device further includes: a second receiving module, configured to, before selecting the target LLMF entity according to the information of the wireless access network where the target UE is located, the positioning QOS requirement, and the pre-stored related information of the LLMF entity, receive a first interface setting request message sent by the access network node; wherein the first interface setting request message explicitly or implicitly indicates that the access network node includes the LLMF entity; a third processing module, configured to store related information of the LLMF entity carried in the first interface setting request message; and feed back a first interface setting response message to the access network node according to the first interface setting request message; wherein the first interface is an NG interface or an S1 interface.

Optionally, the selection device further includes: a fourth processing module, configured to, after feeding back the first interface setting response message to the access network node, initiate a registration process for the NRF entity, and notify the NRF entity of network function (NF) configuration information of the LLMF entity; wherein the NF configuration information at least includes radio access network (RAN) identification information corresponding to the LLMF entity.

An embodiment of the present disclosure provides a selection device of a location management function entity, applied to a second management function entity, which is an access and mobility management function (AMF) entity or a mobility management entity (MME), includes: a third receiving module, configured to receive an enable UE reachability request message sent by a first management function entity; wherein the first management function entity is a location management function (LMF) entity; a first feedback module, configured to feed back an enable UE reachability response message to the first management function entity according to the enable UE reachability request message, wherein the enable UE reachability response message carries information of a wireless access network where a target user equipment (UE) is located.

Optionally, the first feedback module includes: a third processing sub-module, configured to, if the target UE is in a disconnected state, initiate a service session process to the target UE according to an identifier of the target UE, so that the target UE enters a connected state, and information of the wireless access network where the target UE is located is obtained; a first feedback sub-module, configured to feed back an enable UE reachability response message to the first management function entity according to the information of the wireless access network where the target UE is located.

Optionally, the selection device further includes: a fourth receiving module, configured to receive a first interface setting request message sent by an access network node; wherein the first interface setting request message explicitly or implicitly indicates that the access network node includes a local location management function (LLMF) entity; a fifth processing module, configured to store related information of the LLMF entity carried in the first interface setting request message, and feeding back a first interface setting response message to the access network node according to the first interface setting request message; wherein the first interface is an NG interface or an S1 interface.

Optionally, the selection device further includes: a sixth processing module, configured to initiate a registration process for a network repository function (NRF) entity, and notify the NRF entity of network function (NF) configuration information of the LLMF entity; wherein the NF configuration information at least includes radio access network (RAN) identification information corresponding to the LLMF entity.

An embodiment of the present disclosure provides a selection device of a location management function entity, applied to an access network node including a local location management function (LLMF) entity, includes: a fifth receiving module, configured to receive a positioning request message sent by a first management function entity; a seventh processing module, configured to perform a positioning service according to the positioning request message to obtain a positioning result; a second feedback module, configured to feed back the positioning result to the first management function entity.

Optionally, when the first management function entity is an access and mobility management function (AMF) entity or a mobility management entity (MME), the selection device further includes: a second sending module, configured to, before receiving a positioning request message sent by a first management function entity, send a first interface setting request message to the first management function entity; a sixth receiving module, configured to receive a first interface setting response message fed back by the first management function entity according to the first interface setting request message; wherein the first interface setting request message explicitly or implicitly indicates that the access network node includes the LLMF entity; the first interface is an NG interface or an S1 interface.

Optionally, when the first management function entity is a location management function (LMF) entity, the selection device further includes: a third sending module, configured to, before receiving a positioning request message sent by a first management function entity, send a first interface setting request message to a second management function entity; a seventh receiving module, configured to receive a first interface setting response message fed back by the second management function entity according to the first interface setting request message; wherein the second management function entity is an access and mobility management function (AMF) entity or a mobility management entity (MME); the first interface setting request message explicitly or implicitly indicates that the access network node includes the LLMF entity; the first interface is an NG interface or an S1 interface.

An embodiment of the present disclosure provides a selection device of a location management function entity, applied to a gateway mobile location center (GMLC), includes: an eighth receiving module, configured to, after receiving a user equipment (UE) context acquisition response message fed back by a unified data management (UDM) entity, send a positioning request message to the first management function entity; wherein the positioning request message includes an identifier of a target UE and a positioning quality of service (QOS) requirement.

Optionally, when the first management function entity is an access and mobility management function (AMF) entity or a mobility management entity (MME), the eighth receiving module includes: a fourth receiving sub-module, configured to receive a UE context acquisition response message fed back by the UDM entity, the UE context acquisition response message includes address information of the AMF entity or the MME; a fourth sending sub-module, configured to send a positioning request message to the AMF entity or the MME according to the address information of the AMF entity or the MME.

Optionally, when the first management function entity is a positioning management function (LMF) entity, the eighth receiving module includes: a fifth receiving sub-module, configured to receive a UE context acquisition response message fed back by the UDM entity, the UE context acquisition response message includes address information of the LMF entity and address information of the AMF entity or the MME; a fifth sending sub-module, configured to send the positioning request message to the LMF entity according to the address information of the LMF entity.

An embodiment of the present disclosure provides a selection device of a location management function entity, applied to a network storage function (NRF) entity, includes: an eighth processing module, configured to confirm and accept a registration process initiated by a first management function entity or a second management function entity, and register network function (NF) configuration information of a local location management function (LLMF) entity; wherein the first management function entity is an access and mobility management function (AMF) entity or a mobility management entity (MME); the second management function entity is the AMF entity or the MME; the NF configuration information at least includes radio access network (RAN) identification information corresponding to the LLMF entity.

The technical solutions of the present disclosure have the following beneficial effect.

In the selection method of a location management function entity provided by the embodiment of the present disclosure, a positioning request message sent by a gateway mobile location center GMLC is received; the positioning request message includes an identifier of a target UE and a positioning quality of service QOS requirement. Information of a wireless access network where the target UE is located is obtained. A target local location management function (LLMF) entity is selected according to the information of the wireless access network where the target UE is located, the positioning QOS requirement, and pre-stored related information of the LLMF entity; so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

BRIEF DESCRIPTION OF THE DRAWINGS

FIG. 7 is still yet another schematic flow chart of a selection method of a positioning management function entity according to an embodiment of the disclosure;

FIG. 8 is still yet another schematic flow chart of a selection method of a positioning management function entity according to an embodiment of the disclosure;

DETAILED DESCRIPTION

In order to make the technical problems, technical solutions, and advantages to be solved by the present disclosure clearer, a detailed description will be given below with reference to the accompanying drawings and specific embodiments.

Figure 1:
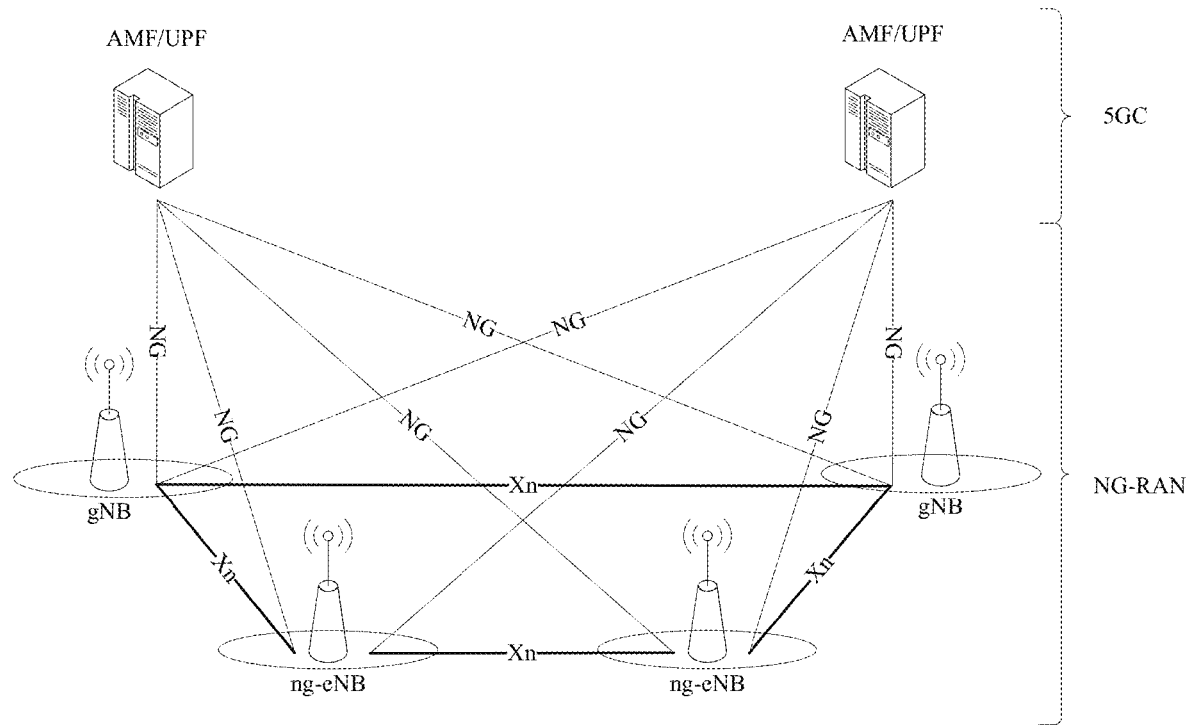
FIG. 1 is a schematic diagram of a 5G mobile communication system in the related art.
Figure 2:
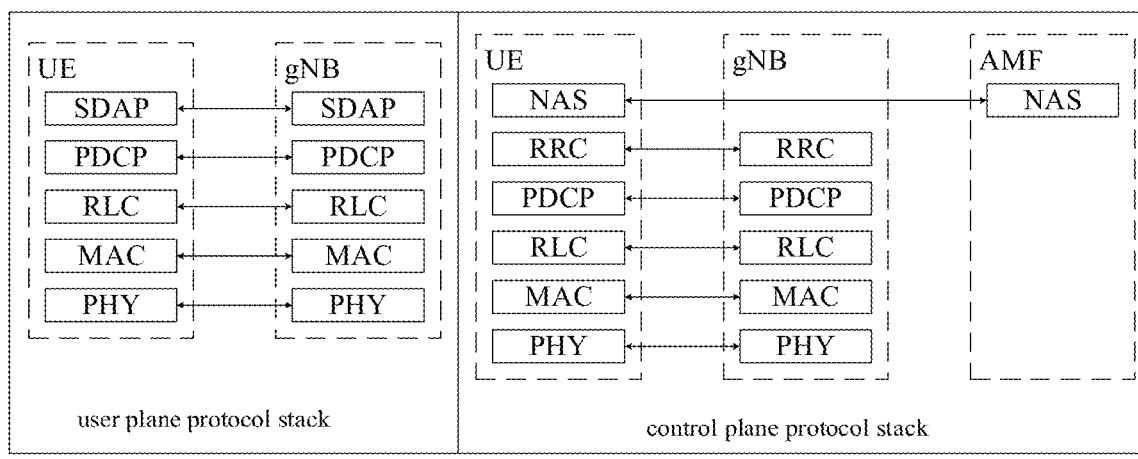
FIG. 2 is a schematic diagram of a 5G wireless protocol architecture in the related art.
Figure 3:
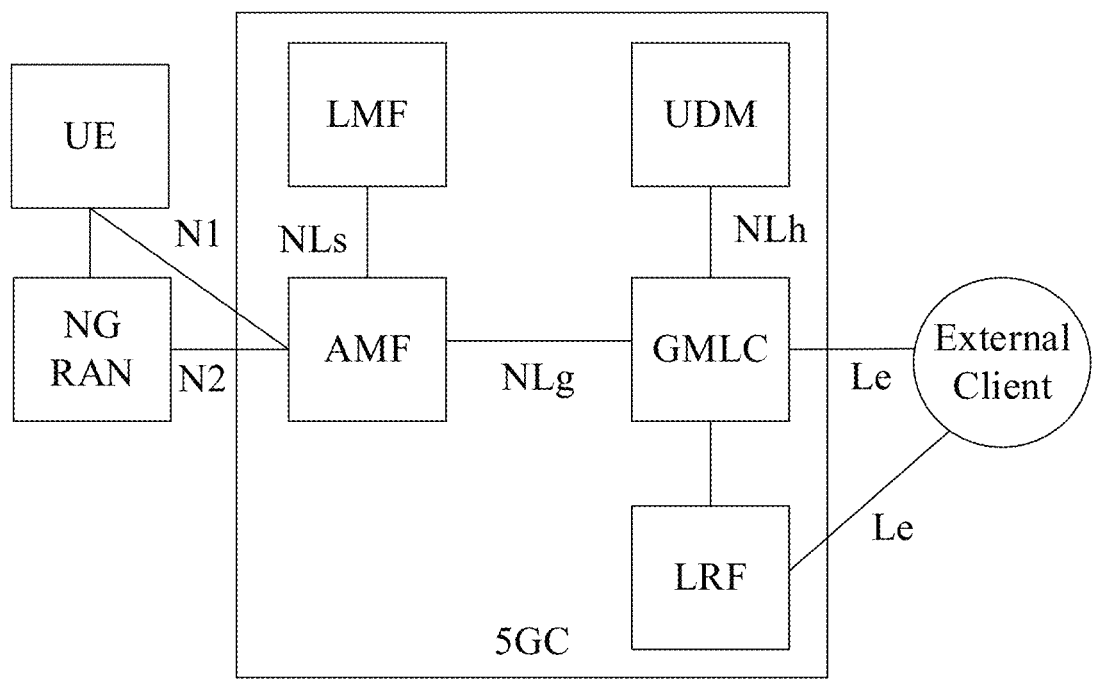
FIG. 3 is a schematic diagram of a 5G positioning network architecture in the related art.
Figure 4:
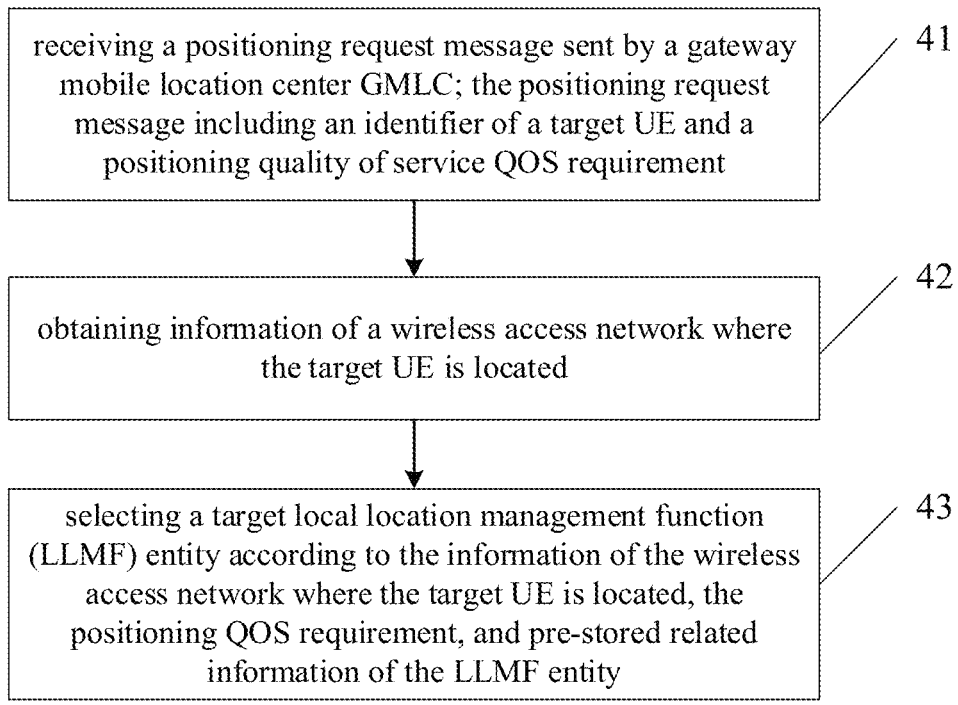
FIG. 4 is a schematic flow chart of a selection method of a positioning management function entity according to an embodiment of the disclosure.

In view of the problem that the positioning management solution increases the overall delay requirement of the positioning service, the present disclosure provides a selection method of a location management function entity, which is applied to a first management function entity, as shown in FIG. 4, includes the following steps.

Step 41: receiving a positioning request message sent by a gateway mobile location center GMLC; the positioning request message including an identifier of a target UE and a positioning quality of service QOS requirement;

Step 42: obtaining information of a wireless access network where the target UE is located;

Step 43: selecting a target local location management function (LLMF) entity according to the information of the wireless access network where the target UE is located, the positioning QOS requirement, and pre-stored related information of the LLMF entity.

In the selection method of a location management function entity provided by the embodiment of the present disclosure, a positioning request message sent by a gateway mobile location center GMLC is received; the positioning request message includes an identifier of a target UE and a positioning quality of service QOS requirement. Information of a wireless access network where the target UE is located is obtained. A target local location management function (LLMF) entity is selected according to the information of the wireless access network where the target UE is located, the positioning QOS requirement, and pre-stored related information of the LLMF entity; so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

The pre-stored related information of the LLMF entity may be obtained by querying an NRF entity.

In the embodiment of the present disclosure, two specific examples are provided for the first management function entity, but they are not limited thereto.

In the first example, the first management function entity is an access and mobility management function AMF entity or a mobility management entity MME.

The obtaining information of the wireless access network where the target UE is located includes: if the target UE is in a disconnected state, initiating a service session process to the target UE according to an identifier of the target UE, so that the target UE enters a connected state, and information of the wireless access network where the target UE is located is obtained.

In the second example, the first management function entity is a location management function LMF entity.

The positioning request message also includes address information of the access and mobility management function AMF entity or the mobility management entity MME.

The obtaining the information of the wireless access network where the target UE is located includes: sending an enable UE reachability request message to the AMF entity or MME according to the address information; the enable UE reachability request message carries the identifier of the target UE; receiving an enable UE reachability response message fed back by the AMF entity or MME according to the enable UE reachability request message; the enable UE reachability response message carries information of the wireless access network where the target UE is located.

The selecting the target LLMF entity according to the information of the wireless access network where the target UE is located, the positioning QOS requirement, and the pre-stored related information of the LLMF entity includes: querying pre-stored related information of the LLMF entity from the unified data management UDM entity according to the information of the wireless access network where the target UE is located; selecting the target LLMF entity according to the positioning QOS requirement and the queried pre-stored related information of the LLMF entity.

In the embodiment of the present disclosure, after selecting the target LLMF entity, the method further includes: sending a positioning request message to an access network node including the target LLMF entity; receiving a positioning result fed back by the access network node according to the positioning request message, and send the positioning result to the GMLC.

The access network node may specifically be a 5G radio access network NG-RAN node.

When the first management function entity is an access and mobility management function AMF entity or a mobility management entity MME, the sending a positioning request message to the access network node including the target LLMF entity includes: sending the positioning request message to the access network node including the target LLMF entity via a network interface.

The network interface can be an NLs interface or an SLs interface, but is not limited to this.

When the first management function entity is a location management function LMF entity, the sending a positioning request message to the access network node including the target LLMF entity includes: sending the positioning request message to the access network node including the target LLMF entity through a newly added network interface.

On the basis of the above-mentioned first example (the first management function entity is the access and mobility management function AMF entity or the mobility management entity MME), before selecting the target LLMF entity according to the information of the wireless access network where the target UE is located, the positioning QOS requirement, and the pre-stored related information of the LLMF entity, the solution provided by the embodiment further includes: receiving a first interface setting request message sent by the access network node; the first interface setting request message explicitly or implicitly indicates that the access network node includes an LLMF entity; storing related information of the LLMF entity carried in the first interface setting request message; and feeding back a first interface setting response message to the access network node according to the first interface setting request message. Wherein, the first interface is an NG interface or an S1 interface.

The NG interface represents a communication interface between the 5G radio access network and the core network; the S1 interface represents a communication interface between the long-term evolution base station LTE eNodeB and the evolved packet core EPC.

Further, after feeding back the first interface setting response message to the access network node, the method further includes: initiating a registration process for the network Repository function NRF entity, and notifying the NRF entity of network function NF configuration information of the LLMF; wherein the NF configuration information at least includes radio access network RAN identification information corresponding to the LLMF.

Specifically, the RAN identification information includes at least one of the following information: the identity of the access network node (which may be an NG-RAN node); the IP address of the LLMF; and the identification ID of the LLMF.

In the embodiment of the present disclosure, the indicating that the access network node includes an LLMF entity including at least one of the following conditions: carrying local positioning function indication information; carrying identity information of the LLMF; carrying IP address information of the LLMF; carrying the positioning capability information of the LLMF. The carrying of information can be either explicit or implicit.

Figure 5:
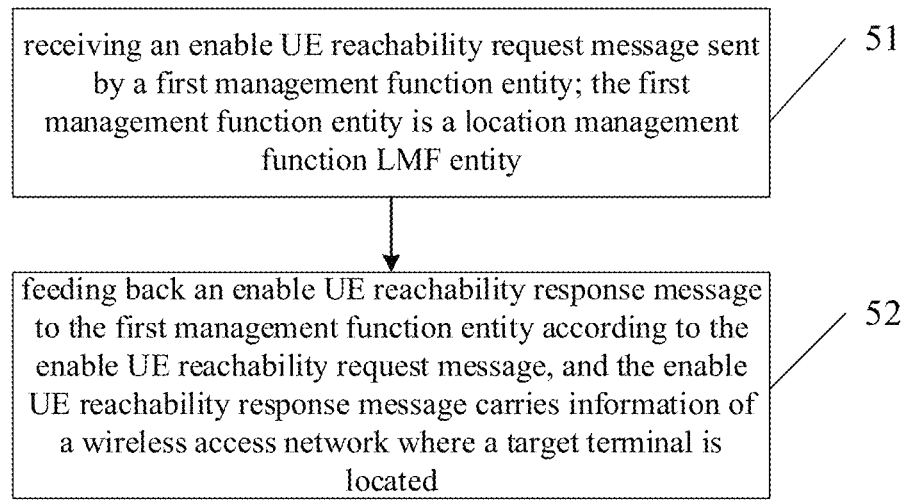
FIG. 5 is another a schematic flow chart of a selection method of a positioning management function entity according to an embodiment of the disclosure.

The embodiment of the present disclosure also provides a selection method of a location management function entity, which is applied to a second management function entity, and the second management function entity is an access and mobility management function AMF entity or a mobility management entity MME. As shown in FIG. 5, the selection method includes the following steps.

Step 51: receiving an enable UE reachability request message sent by a first management function entity; the first management function entity is a location management function LMF entity;

Step 52: feeding back an enable UE reachability response message to the first management function entity according to the enable UE reachability request message, and the enable UE reachability response message carries information of a wireless access network where a target terminal is located.

In the selection method of the location management function entity provided by the embodiment of the present disclosure, an enable UE reachability request message sent by a first management function entity is received; the first management function entity is a location management function LMF entity; an enable UE reachability response message is fed back to the first management function entity according to the enable UE reachability request message, and the enable UE reachability response message carries information of a wireless access network where a target terminal is located; so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

The feeding back an enable UE reachability response message to the first management function entity according to the enable UE reachability request message includes: if the target UE is in a disconnected state, initiating a service session process to the target UE according to an identifier of the target UE, so that the target UE enters a connected state, and information of the wireless access network where the target UE is located is obtained. An enable UE reachability response message is fed back to the first management function entity according to the information of the wireless access network where the target UE is located.

Further, before the receiving an enable UE reachability request message sent by a first management function entity, the method further includes: receiving a first interface setting request message sent by the access network node; wherein the first interface setting request message either explicitly or implicitly indicates that the access network node includes an LLMF entity; storing related information of the LLMF carried in the first interface setting request message, and feeding back the first interface setting response message to the access network node according to the first interface setting request message; wherein, the first interface is an NG interface or an S1 interface.

The NG interface represents a communication interface between the 5G radio access network and the core network; the S1 interface represents a communication interface between the long-term evolution base station LTE eNodeB and the evolved packet core EPC.

Further, after feeding back the first interface setting response message to the access network node, the method further includes: initiating a registration process for the network Repository function NRF entity, and notifying the NRF entity of network function NF configuration information of the LLMF; wherein the NF configuration information at least includes radio access network RAN identification information corresponding to the LLMF.

Specifically, the RAN identification information includes at least one of the following information: the identity of the access network node (which may be an NG-RAN node); the IP address of the LLMF; and the identification ID of the LLMF.

In the embodiment of the present disclosure, the indicating that the access network node includes an LLMF entity including at least one of the following conditions: carrying local positioning function indication information; carrying identity information of the LLMF; carrying IP address information of the LLMF; carrying the positioning capability information of the LLMF.

Figure 6:
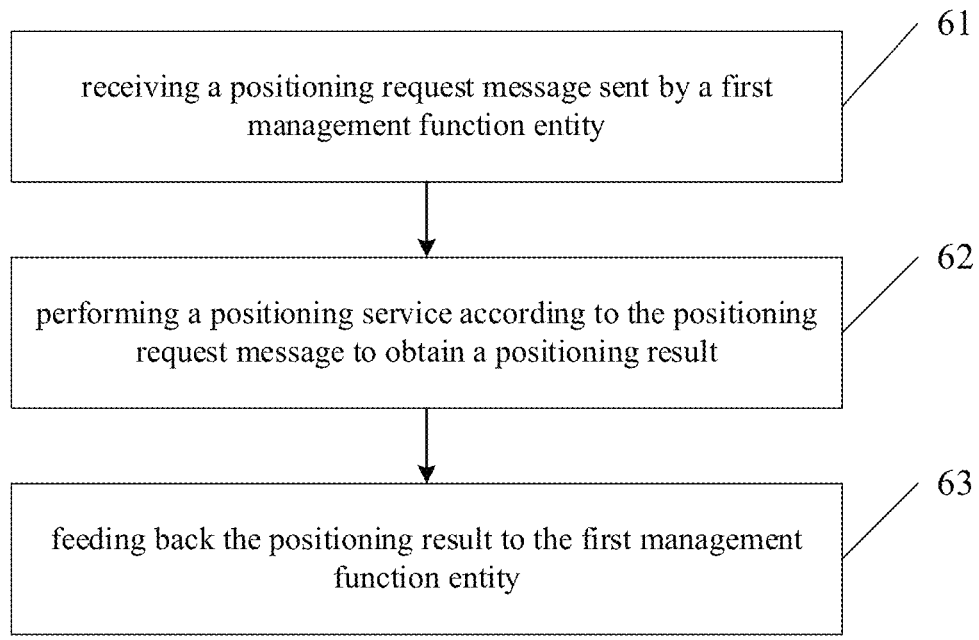
FIG. 6 is yet another schematic flow chart of a selection method of a positioning management function entity according to an embodiment of the disclosure.

The embodiment of the present disclosure also provides a selection method of a location management function entity, which is applied to an access network node including a local location management function LLMF entity, as shown in FIG. 6, the selection method includes the following steps.

Step 61: receiving a positioning request message sent by a first management function entity;

Step 62: performing a positioning service according to the positioning request message to obtain a positioning result;

Step 63: feeding back the positioning result to the first management function entity.

In the selection method of a location management function entity provided by the embodiment of the present disclosure, a positioning request message sent by a first management function entity is received; a positioning service is performed according to the positioning request message to obtain a positioning result; and the positioning result is fed back to the first management function entity, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

When the first management function entity is an access and mobility management function AMF entity or a mobility management entity MME, the receiving the positioning request message sent by the first management function entity includes: receiving the positioning request message sent by the first management function entity via a network interface.

The network interface can be an NLs interface or an SLs interface, but is not limited to this.

When the first management function entity is the location management function LMF entity, the receiving a positioning request message sent by the first management function entity includes: receiving the positioning request message sent by the first management function entity through a newly added network interface.

Further, when the first management function entity is an access and mobility management function AMF entity or a mobility management entity MME, before receiving the positioning request message sent by the first management function entity, the method further includes: sending a first interface setting request message to the first management function entity; receiving a first interface setting response message fed back by the first management function entity according to the first interface setting request message; wherein the first interface setting request message either explicitly or implicitly indicates that the access network node includes an LLMF entity; the first interface is an NG interface or an S1 interface.

The NG interface represents a communication interface between the 5G radio access network and the core network; the S1 interface represents a communication interface between the long-term evolution base station LTE eNodeB and the evolved packet core EPC.

When the first management function entity is the location management function LMF entity, before receiving the positioning request message sent by the first management function entity, the method further includes: sending a first interface setting request message to a second management function entity; and receiving a first interface setting response message fed back by the second management function entity according to the first interface setting request message; wherein the second management function entity is an access and mobility management function AMF entity or a mobility management entity MME; the first interface setting request message explicitly or implicitly indicates that the access network node includes an LLMF entity; the first interface is an NG interface or an S1 interface.

The NG interface represents a communication interface between the 5G radio access network and the core network; the S1 interface represents a communication interface between the long-term evolution base station LTE eNodeB and the evolved packet core EPC.

Specifically, the indicating that the access network node includes an LLMF entity including at least one of the following conditions: carrying local positioning function indication information; carrying identity information of the LLMF; carrying IP address information of the LLMF; carrying the positioning capability information of the LLMF.

The embodiment of the present disclosure also provides a selection method of a location management function entity, which is applied to a gateway mobile location center GMLC, as shown in FIG. 7, the selection method includes the following steps.

Step 71: after receiving a UE context acquisition response message fed back by a unified data management UDM entity, sending a positioning request message to the first management function entity.

Wherein, the positioning request message includes an identifier of the target UE and a positioning quality of service QOS requirement.

In the selection method of a location management function entity provided by the embodiment of the present disclosure, after receiving a UE context acquisition response message fed back by a unified data management UDM entity, a positioning request message is sent to the first management function entity. Wherein, the positioning request message includes an identifier of the target UE and a positioning quality of service QOS requirement, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

When the first management function entity is an access and mobility management function AMF entity or a mobility management entity MME, after receiving a UE context acquisition response message fed back by a unified data management UDM entity, sending a positioning request message to the first management function entity includes: receiving a UE context acquisition response message fed back by the unified data management UDM entity, the UE context response message includes address information of the AMF entity or MME; sending a positioning request message to the AMF entity or MME according to the address information of the AMF entity or MME.

When the first management function entity is a location management function LMF entity, after receiving the UE context acquisition response message fed back by the unified data management UDM entity, sending a positioning request message to the first management function entity includes: receiving the UE context acquisition response message fed back by the UDM entity, the UE context response message includes address information of the LMF entity and address information of the AMF entity or MME; and sending a positioning request message to the LMF entity according to the address information of the LMF entity.

The embodiment of the present disclosure also provides a selection method of a location management function entity, which is applied to a network storage function NRF entity, as shown in FIG. 8, the selection method includes the following steps.

Step 81: confirming and accepting a registration process initiated by a first management function entity or a second management function entity, and registering network function NF configuration information of a local location management function LLMF.

Wherein, the first management function entity is an access and mobility management function AMF entity or a mobility management entity MME; the second management function entity is an access and mobility management function AMF entity or a mobility management entity MME; the NF configuration information at least includes radio access network RAN identification information corresponding to the LLMF.

In the selection method of a location management function entity provided by the embodiment of the present disclosure, a registration process initiated by a first management function entity or a second management function entity is confirmed and accept, and network function NF configuration information of a local location management function LLMF is registered. Wherein the first management function entity is an access and mobility management function AMF entity or a mobility management entity MME; the second management function entity is an access and mobility management function AMF entity or a mobility management entity MME; the NF configuration information at least includes radio access network RAN identification information corresponding to the LLMF, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Specifically, the RAN identification information includes at least one of the following information: identity of an access network node (which may be an NG-RAN node); IP address of the LLMF; and identification ID of the LLMF.

The selection method of the location management function entity provided by the embodiment of the present disclosure is further described in combination with the first management function entity, the second management function entity, the access network node, the gateway mobile location center GMLC, and the network storage function NRF entity.

In view of the above technical problems, the embodiments of the present disclosure provide a selection method of a location management function entity (specifically, a register and selection method of a local location management function entity), so as ensure that under the local positioning network architecture, the local location management function entity can serve the core network in a better way, and a simple and efficient positioning service is provided to meet the high-precision and low-latency positioning requirements of the 5G positioning network architecture. There is a corresponding positioning network architecture, for example, such as the sinking of positioning functions, which can meet the service requirements of obtaining lower-latency positioning services under the 5G positioning network architecture, thereby creating higher commercial value for the society.

In the solution provided by the embodiments of the present disclosure, the local location management function entity (Local LMF) can be located in the access network, for example, located in a same base station as the 5G base station (NR gNB). When the core network has positioning requirements, it will select an appropriate local location management function entity based on a certain principle, for example, the positioning QOS, the location of the UE, the capabilities of the local LMF, the positioning type (whether it is immediate or delayed), etc., and send a positioning request message to the local LMF.

Specifically, the following procedures are involved. For example, the access network node is the 5G radio access network NG-RAN node, but it is not limited to this.

Figure 9:
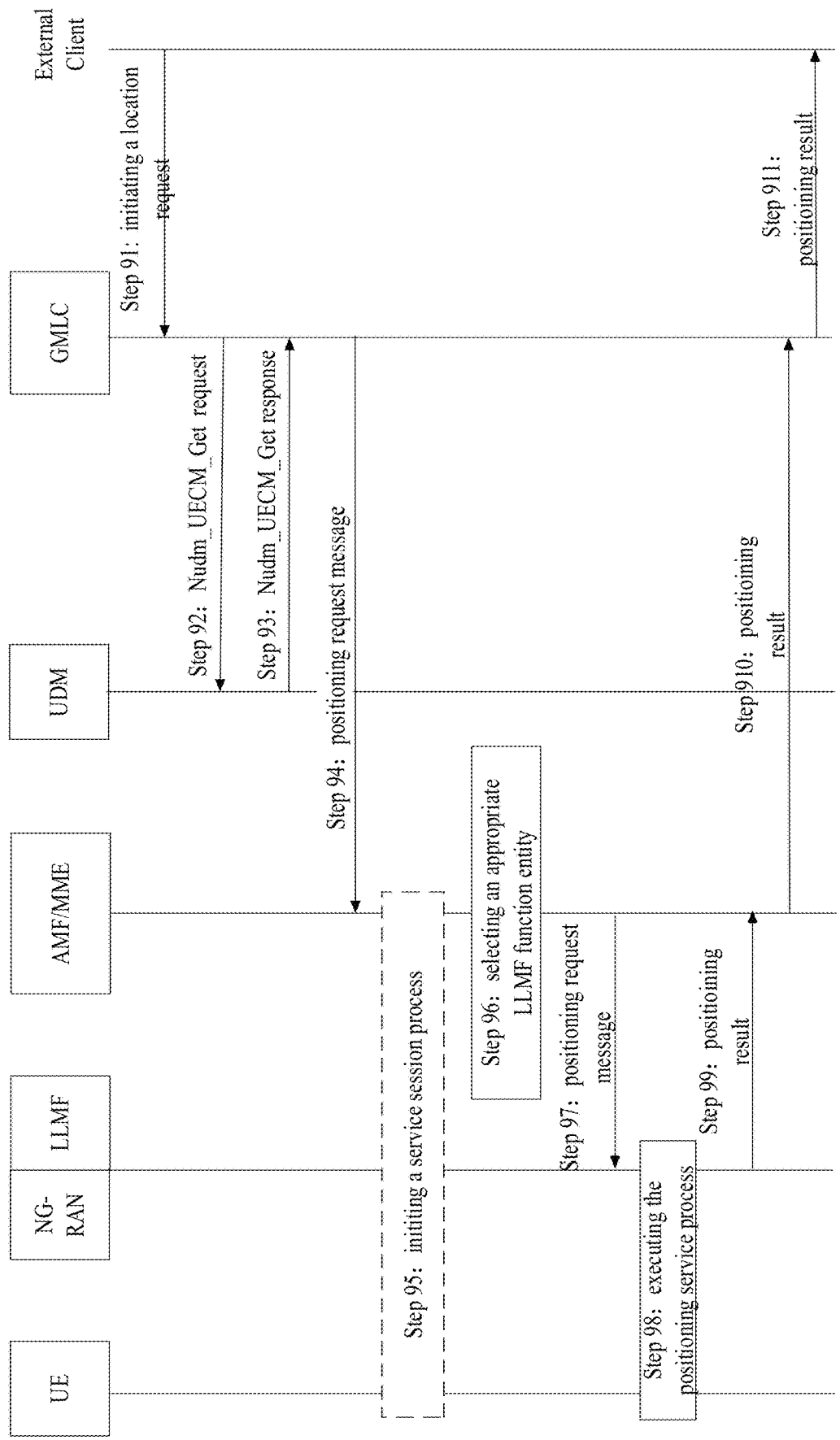
FIG. 9 is a schematic diagram of the selection process of Local LMF according to an embodiment of the disclosure.

Process 1: an AMF based selection process of Local LMF, as shown in FIG. 9, can include the following steps.

Step 91: A positioning client (External Client) initiates a location request, and the request message includes an identifier of the target UE and a positioning QOS requirement, etc.

Step 92: Gateway Mobile Location Centre (GMLC) sends Nudm_UE CM_Get request message (terminal context get request message) to Unified Data Management (UDM), the message carries the identification information of the target UE.

Step 93: The GMLC receives a Nudm_UE CM_Get Response message (terminal context get response message), and the message returns address information of the AMF/MME (AMF or MME).

Step 94: The GMLC sends a positioning request message to the AMF/MME, the request message includes the identifier of the target UE and the positioning QOS requirement.

Step 95: If the target UE is in a disconnected state, the AMF/MME initiates a service session process for the target UE to enter a connected state and learn information of the RAN where the target UE is located;

If the target UE is in the connected state, the AMF/MME can directly learn the information of the RAN where the target UE is located.

Step 96: The AMF/MME selects an appropriate LLMF function entity based on the information of the RAN where the target UE is located, and the positioning QOS requirement, as well as the pre-stored related information of LLMF (such as positioning capabilities), etc.

Optionally, AMF/MME queries the related information of LLMF through Network Repository Function (NRF).

Step 97: The AMF/MME sends a positioning request message to the LLMF through the NLs or SLs interface, and the request message includes an identifier of the positioning session, the identifier of the target UE, the positioning QOS requirement and other information;

Step 98: LLMF executes the positioning service process.

Steps 99 to 911: The positioning results will be returned to the corresponding network entities, AMF/MME, GMLC and the final positioning client in turn from LLMF. The specific retuning process is not limited here.

Figure 10:
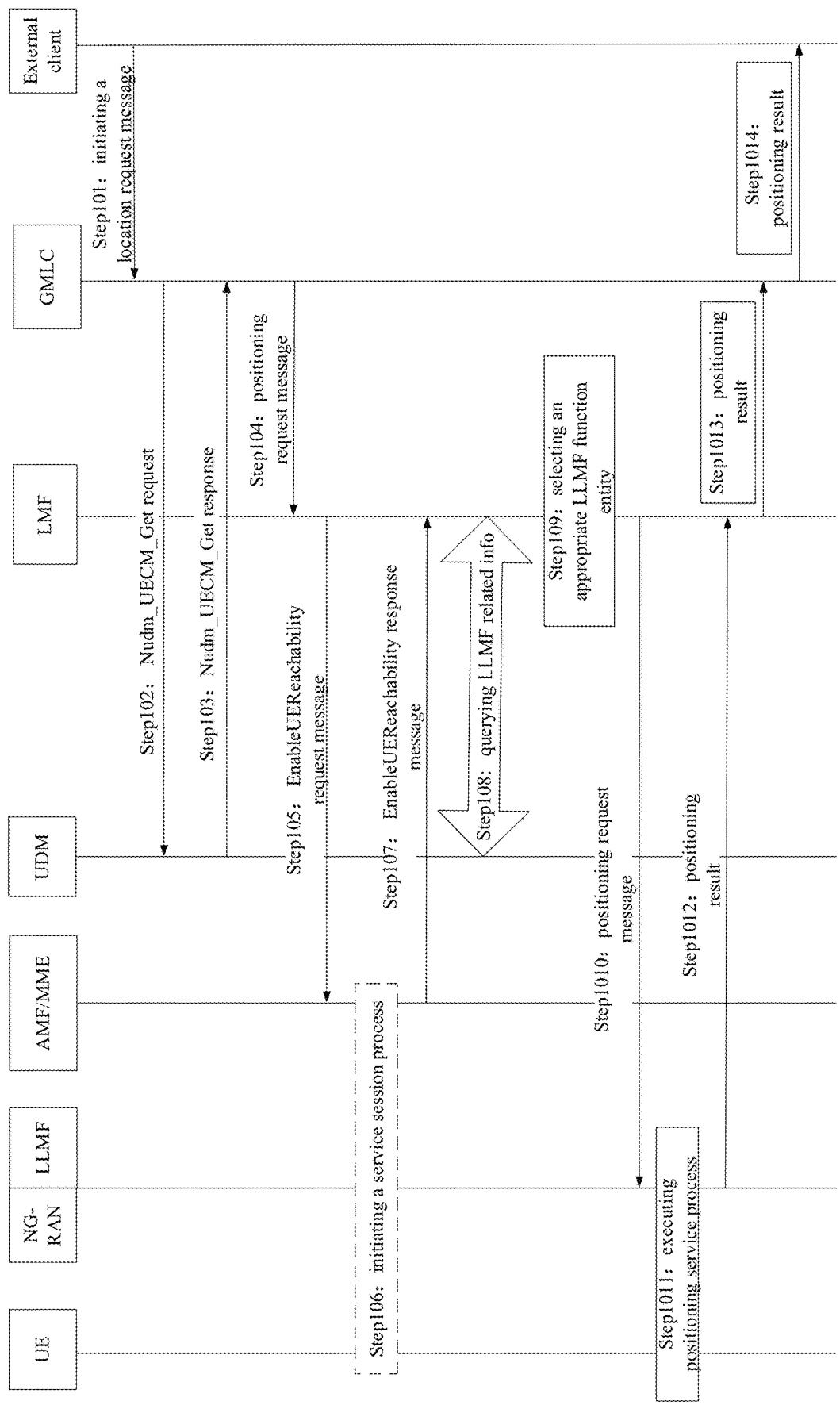
FIG. 10 is another schematic diagram of the selection process of Local LMF according to an embodiment of the disclosure.

Process 2: LMF based selection process of Local LMF-, as shown in FIG. 10, can include the following steps.

Step 101: The positioning client (External Client) initiates a location request, and the request message includes the identifier of the target UE, and the positioning QOS requirement, etc.

Step 102: The GMLC sends a Nudm_UE CM_Get request message (terminal context get request message) to UDM, the message carries the identification information of the target UE.

Step 103: The GMLC receives the Nudm_UE CM_Get response message (terminal context get response message), and the message returns the address information of LMF and AMF/MME (AMF or MME).

Step 104: The GMLC sends the positioning request message to LMF. The request message includes the identifier of the target UE, the positioning QOS requirement and address information of corresponding AMF/MME, etc.

Step 105: The LMF initiates an EnableUEReachability request message to the corresponding AMF/MME (a request message for enabling the UE to reach the capability);

Step 106: If the target UE is in a disconnected state, the AMF/MME initiates a service session process for the target UE to enter a connected state, and learns the information of the RAN where the target UE is located.

If the target UE is in the connected state, the AMF/MME can directly learn the information of the RAN where the target UE is located.

Step 107: AMF/MME returns an EnableUEReachability response message (a response message for enabling the terminal to reach the capability), which carries information of the RAN where the target UE is located.

Step 108: The LMF queries UDM for pre-stored related information of LLMF (such as positioning capabilities) and so on based on the information of the RAN where the target UE is located.

Optionally, LMF queries the related information of LLMF through NRF.

Step 109: The LMF selects an appropriate LLMF function entity according to the positioning QOS requirement and the related information (such as positioning capability) of the LLMF obtained above.

Step 1010: The LMF sends a positioning request message to the LLMF through a newly defined network interface, the request message includes the identifier of the positioning session, the identifier of the target UE, the positioning QOS requirement and other information.

Step 1011: LLMF executes the positioning service process.

Steps 1012-1014: The positioning results will be returned to the corresponding network entity, LMF, GMLC and the final positioning client in turn from LLMF.

The specific returning process is not limited here.

Figure 11:
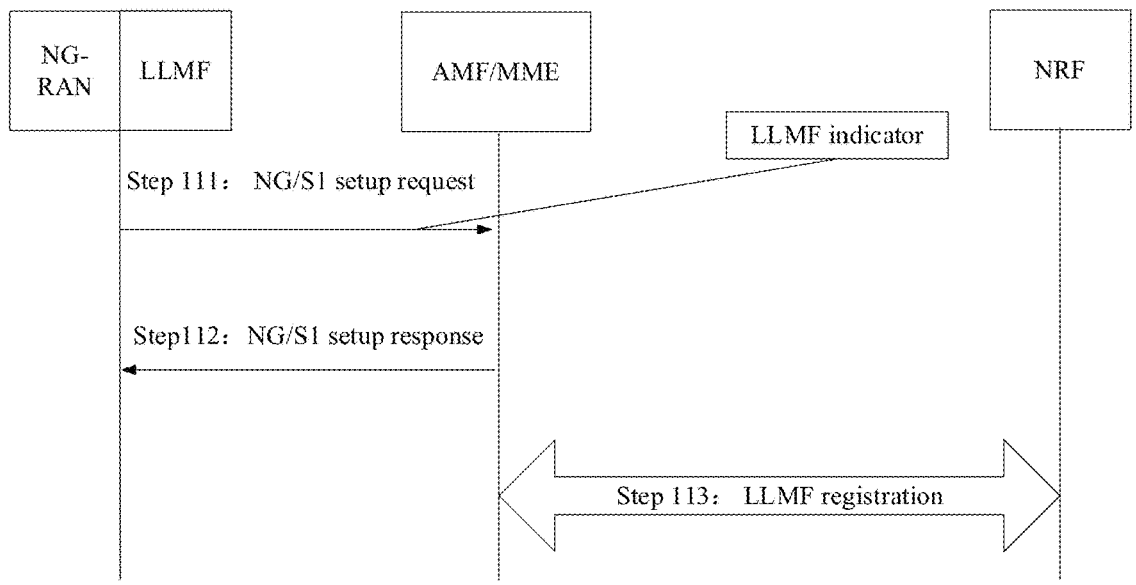
FIG. 11 is a schematic diagram of a registration process of Local LMF to NRF according to an embodiment of the disclosure.

Process 3: A registration process of Local LMF to NRF, as shown in FIG. 11, may include the following steps.

Step 111: When NG-RAN initiates a NG/S1 Setup process (NG interface or S1 interface setting) for the core network (such as AMF or MME), the NG/S1 Setup request (NG interface or S1 interface setting request) explicitly or implicitly indicates that a function entity LLMF is included therein, for example, explicitly carries local positioning function indication information, or implicitly carries identification ID information of LLMF, or implicitly carries related capability information of the positioning function, or implicitly carries IP Address information.

Wherein, the positioning capability information includes, but is not limited to, the positioning algorithm that LLMF may support, or corresponding accuracy, or positioning response time, or the maximum number of positions that can be supported, and so on.

The IP address of LLMF can be used in subsequent transmission of NLs AP (an interface message between LLMF and AMF) or SLs AP (an interface message between LLMF and MME).

The identification ID of LLMF can be used for subsequent core network related entities, such as AMF or LMF, to query the storage center or Operation Maintenance Management (OAM) for related capabilities and other information.

LLMF Indicator in the figure represents an LLMF indicator.

Step 112: AMF/MME (AMF or MME) will store the corresponding information carried in the NG/S1 Setup request, and return an NG/S1 Setup response (NG interface or S1 interface setup response) message.

Step 113: Optionally, AMF will initiate an NRF-oriented registration process and notify NRF about NF configuration of LLMF, where the parameters include at least corresponding RAN identification information, such as NG-RAN id, or IP address of LLMF or identification ID of LLMF and so on, for the subsequent selection of location management function. Accordingly, NRF will confirm and accept this registration.

It can be seen from the above that the embodiments of the present disclosure specifically provide a solution for registration and selection of a local location management function entity, so as ensure that under the local positioning network architecture, the local location management function entity can serve the core network in a better way, and a simple and efficient positioning service is provided to meet the high-precision and low-latency positioning requirements of the 5G positioning network architecture, thereby creating higher commercial value for the society.

The embodiments of the present disclosure also provide a first management function entity, including a memory, a processor, a transceiver, and a computer program stored on the memory and executed by the processor; the processor executes the program to implement the following steps: receiving a positioning request message sent by a gateway mobile location center GMLC through the transceiver; the positioning request message including an identifier of a target UE and a positioning quality of service QOS requirement; obtaining information of a wireless access network where the target UE is located; and selecting a target local location management function (LLMF) entity according to the information of the wireless access network where the target UE is located, the positioning QOS requirement, and pre-stored related information of the LLMF entity.

The first management function entity provided by the embodiment of the present disclosure receives a positioning request message sent by a gateway mobile location center GMLC; the positioning request message includes an identifier of a target UE and a positioning quality of service QOS requirement; obtains information of a wireless access network where the target UE is located; and selects a target local location management function (LLMF) entity according to the information of the wireless access network where the target UE is located, the positioning QOS requirement, and pre-stored related information of the LLMF entity, so as to ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Figure 12:
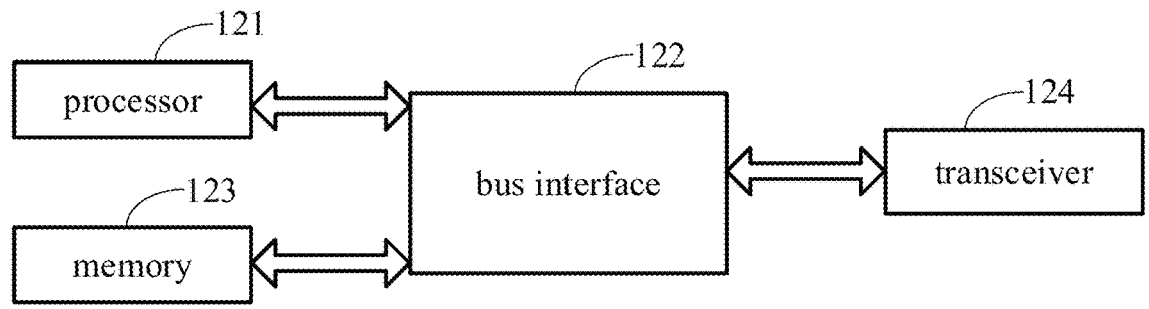
FIG. 12 is a schematic diagram of a first management function entity according to an embodiment of the disclosure.

Specifically, as shown in FIG. 12, the first management function entity of the embodiment of the present disclosure includes: a processor 121; and a memory 123 connected to the processor 121 through a bus interface 122, the memory 123 is used to store programs and data used by the processor 121 when performing operations, when the processor 121 calls and executes the programs and data stored in the memory 123, the following process is executed: receiving a positioning request message sent by a gateway mobile location center GMLC through the transceiver 124; the positioning request message including an identifier of a target UE and a positioning quality of service QOS requirement; obtaining information of a wireless access network where the target UE is located; and selecting a target local location management function (LLMF) entity according to the information of the wireless access network where the target UE is located, the positioning QOS requirement, and pre-stored related information of the LLMF entity.

The transceiver 124 is connected to the bus interface 122 and is used to receive and send data under the control of the processor 121.

It should be noted that, in FIG. 12, the bus architecture may include any number of interconnected buses and bridges, specifically various circuits of one or more processors represented by the processor 121 and the memory represented by the memory 123 are linked together. The bus architecture can also link various other circuits such as peripherals, voltage regulators, power management circuits, etc., which are all known in the art, and therefore, no further description will be given herein. The bus interface provides the interface. The transceiver 124 may be a plurality of elements, that is, including a transmitter and a receiver, and provide a unit for communicating with various other devices on the transmission medium. The processor 121 is responsible for managing the bus architecture and general processing, and the memory 123 can store data used by the processor 121 when performing operations.

Those skilled in the art can understand that all or part of the steps in the above-mentioned embodiments can be implemented by hardware, or by a computer program to instruct relevant hardware. The computer program includes instructions for performing part or all of the steps of the above-mentioned method. The computer program can be stored in a readable storage medium, which can be any form of storage medium.

The pre-stored related information of the LLMF entity may be obtained by querying an NRF entity.

In the embodiment of the present disclosure, two specific examples are provided for the first management function entity, but they are not limited thereto.

In the first example, the first management function entity is an access and mobility management function AMF entity or a mobility management entity MME.

The processor is specifically configured to: if the target UE is in a disconnected state, initiate a service session process to the target UE according to an identifier of the target UE, so that the target UE enters a connected state, and information of the wireless access network where the target UE is located is obtained.

In the second example, the first management function entity is a location management function LMF entity.

The positioning request message also includes address information of the access and mobility management function AMF entity or the mobility management entity MME.

The processor is specifically configured to: send an enable UE reachability request message to the AMF entity or MME according to the address information; the enable UE reachability request message carries the identifier of the target UE; receive an enable UE reachability response message fed back by the AMF entity or MME according to the enable UE reachability request message; the enable UE reachability response message carries information of the wireless access network where the target UE is located.

The processor is specifically configured to: query pre-stored related information of the LLMF entity from the unified data management UDM entity according to the information of the wireless access network where the target UE is located; select the target LLMF entity according to the positioning QOS requirement and the queried pre-stored related information of the LLMF entity.

In the embodiment of the present disclosure, further, the processor is further configured to: after selecting the target LLMF entity, send a positioning request message to the access network node containing the target LLMF entity through the transceiver; The network access node feeds back the positioning result according to the positioning request message, and sends the positioning result to the GMLC.

When the first management function entity is an access and mobility management function AMF entity or a mobility management entity MME, the processor is specifically configured to: send a network interface to the access network node that includes the target LLMF entity Send positioning request message.

When the first management function entity is a location management function LMF entity, the processor is specifically configured to: send a positioning request message to the access network node including the target LLMF entity through a newly added network interface.

On the basis of the above-mentioned first example (the first management function entity is the access and mobility management function AMF entity or the mobility management entity MME), the processor is specifically configured to: before selecting the target LLMF entity according to the information of the wireless access network where the target UE is located, the positioning QOS requirement, and the pre-stored related information of the LLMF entity, receive a first interface setting request message sent by the access network node through the transceiver; the first interface setting request message explicitly or implicitly indicates that the access network node includes an LLMF entity; store related information of the LLMF entity carried in the first interface setting request message; and feed back a first interface setting response message to the access network node according to the first interface setting request message. Wherein, the first interface is an NG interface or an S1 interface.

Further, the processor is further configured to: after feeding back the first interface setting response message to the access network node, initiate a registration process for the network Repository function NRF entity, and notify the NRF entity of network function NF configuration information of the LLMF; wherein the NF configuration information at least includes radio access network RAN identification information corresponding to the LLMF.

Specifically, the RAN identification information includes at least one of the following information: the identity of the access network node; the IP address of the LLMF; and the identification ID of the LLMF.

In the embodiment of the present disclosure, the indicating that the access network node includes an LLMF entity including at least one of the following conditions: carrying local positioning function indication information; carrying identity information of the LLMF; carrying IP address information of the LLMF; carrying the positioning capability information of the LLMF.

Wherein, the implementation embodiments of the selection method of a location management function entity on the first management function entity side are all applicable to the embodiment of the first management function entity, and the same technical effect can also be achieved.

The embodiment of the present disclosure also provides a second management function entity, including a memory, a processor, a transceiver, and a computer program stored on the memory and executed by the processor; the second management function entity is the access and mobility management function AMF entity or the mobility management entity MME, the processor executes the program to implement the following steps: receiving an enable UE reachability request message sent by a first management function entity through the transceiver; the first management function entity is a location management function LMF entity; feeding back an enable UE reachability response message to the first management function entity according to the enable UE reachability request message, and the enable UE reachability response message carries information of a wireless access network where a target terminal is located.

The second management function entity provided by the embodiment of the present disclosure receives an enable UE reachability request message sent by a first management function entity through the transceiver; the first management function entity is a location management function LMF entity; feeds back an enable UE reachability response message to the first management function entity according to the enable UE reachability request message, and the enable UE reachability response message carries information of a wireless access network where a target terminal is located, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Figure 13:
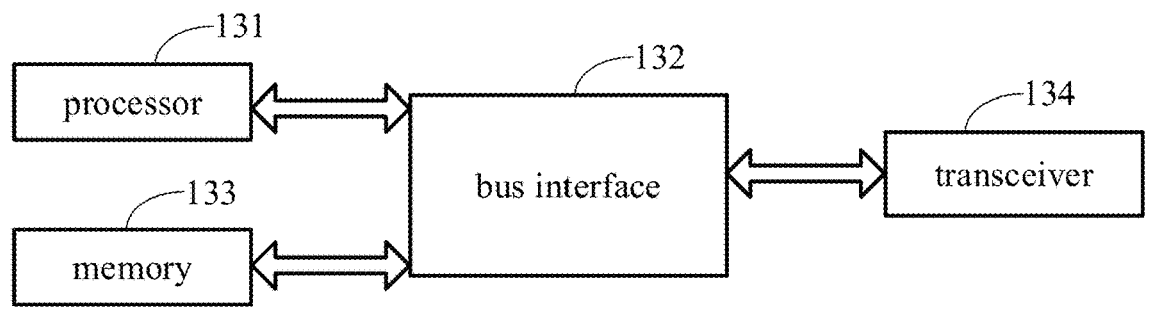
FIG. 13 is a schematic structural diagram of a second management function entity according to an embodiment of the disclosure.

Specifically, as shown in FIG. 13, the second management function entity of the embodiment of the present disclosure includes: a processor 131; and a memory 133 connected to the processor 131 via a bus interface 132. The memory 133 is used to store programs and data used by the processor 131 when performing operations. When the processor 131 calls and executes the programs and data stored in the memory 133, the following process is executed: receiving an enable UE reachability request message sent by a first management function entity through the transceiver 134; the first management function entity is a location management function LMF entity; feeding back an enable UE reachability response message to the first management function entity according to the enable UE reachability request message, and the enable UE reachability response message carries information of a wireless access network where a target terminal is located.

Among them, the transceiver 134 is connected to the bus interface 132 and is used to receive and send data under the control of the processor 131.

It should be noted that in FIG. 13, the bus architecture may include any number of interconnected buses and bridges. Specifically, various circuits of one or more processors represented by the processor 131 and the memory represented by the memory 133 are linked together. The bus architecture can also link various other circuits such as peripheral devices, voltage regulators, power management circuits, etc., which are all known in the art, and therefore, no further descriptions are provided herein. The bus interface provides the interface. The transceiver 134 may be a plurality of elements, that is, including a transmitter and a receiver, and provide a unit for communicating with various other devices on the transmission medium. The processor 131 is responsible for managing the bus architecture and general processing, and the memory 133 can store data used by the processor 131 when performing operations.

Those skilled in the art can understand that all or part of the steps in the above-mentioned embodiments can be implemented by hardware, or by a computer program to instruct relevant hardware. The computer program includes instructions for performing part or all of the steps of the above-mentioned method. The computer program can be stored in a readable storage medium, which can be any form of storage medium.

Wherein, the processor is specifically configured to: if the target UE is in a disconnected state, initiate a service session process to the target UE according to an identifier of the target UE, so that the target UE enters a connected state, and information of the wireless access network where the target UE is located is obtained. An enable UE reachability response message is fed back to the first management function entity according to the information of the wireless access network where the target UE is located.

Further, the processor is further configured to: before the receiving an enable UE reachability request message sent by a first management function entity, receive a first interface setting request message sent by the access network node; wherein the first interface setting request message either explicitly or implicitly indicates that the access network node includes an LLMF entity; store related information of the LLMF carried in the first interface setting request message, and feed back the first interface setting response message to the access network node according to the first interface setting request message; wherein, the first interface is an NG interface or an S1 interface.

Furthermore, the processor is further configured to: after feeding back the first interface setting response message to the access network node, initiate a registration process for the network Repository function NRF entity, and notify the NRF entity of network function NF configuration information of the LLMF; wherein the NF configuration information at least includes radio access network RAN identification information corresponding to the LLMF.

Specifically, the RAN identification information includes at least one of the following information: the identity of the access network node; the IP address of the LLMF; and the identification ID of the LLMF.

In the embodiment of the present disclosure, the indicating that the access network node includes an LLMF entity including at least one of the following conditions: carrying local positioning function indication information; carrying identity information of the LLMF; carrying IP address information of the LLMF; carrying the positioning capability information of the LLMF.

The implementation embodiments of the selection method of a location management function entity on the second management function entity side are all applicable to the embodiments of the second management function entity, and the same technical effect can also be achieved.

The embodiment of the present disclosure also provides an access network node, the access network node includes a local location management function LLMF entity, including a memory, a processor, a transceiver, a program stored on the memory and executed by the processor. When the processor executes the program, the following steps are implemented: receiving a positioning request message sent by a first management function entity through the transceiver; performing a positioning service according to the positioning request message to obtain a positioning result; and feeding back the positioning result to the first management function entity.

The access network node provided by the embodiment of the present disclosure receives a positioning request message sent by a first management function entity through the transceiver; performs a positioning service according to the positioning request message to obtain a positioning result; and feeds back the positioning result to the first management function entity, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Figure 14:
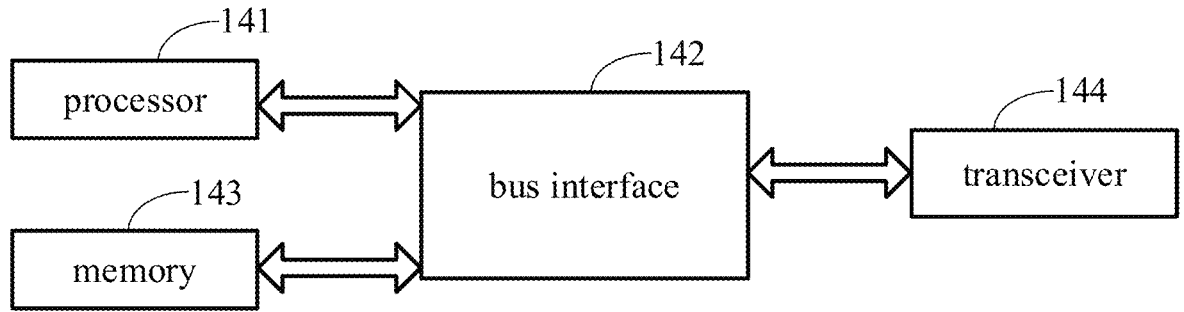
FIG. 14 is a schematic diagram of an access network node according to an embodiment of the disclosure.

Specifically, as shown in FIG. 14, the access network node of the embodiment of the present disclosure includes: a processor 141; and a memory 143 connected to the processor 141 through a bus interface 142, the memory 143 is used to store programs and data used by the processor 141 when performing operations, when the processor 141 calls and executes the programs and data stored in the memory 143, the following process is executed: receiving a positioning request message sent by a first management function entity through the transceiver 144; performing a positioning service according to the positioning request message to obtain a positioning result; and feeding back the positioning result to the first management function entity.

The transceiver 144 is connected to the bus interface 142 for receiving and sending data under the control of the processor 141.

It should be noted that in FIG. 14, the bus architecture may include any number of interconnected buses and bridges. Specifically, various circuits of one or more processors represented by the processor 141 and the memory represented by the memory 143 are linked together. The bus architecture can also link various other circuits such as peripheral devices, voltage regulators, power management circuits, etc., which are all known in the art, and therefore, no further descriptions are provided herein. The bus interface provides the interface. The transceiver 144 may be a plurality of elements, that is, including a transmitter and a receiver, and provide a unit for communicating with various other devices on the transmission medium. The processor 141 is responsible for managing the bus architecture and general processing, and the memory 143 can store data used by the processor 141 when performing operations.

Those skilled in the art can understand that all or part of the steps in the above-mentioned embodiments can be implemented by hardware, or by a computer program to instruct relevant hardware. The computer program includes instructions for performing part or all of the steps of the above-mentioned method. The computer program can be stored in a readable storage medium, which can be any form of storage medium.

When the first management function entity is an access and mobility management function AMF entity or a mobility management entity MME, the processor is specifically configured to receive a positioning request message sent by the first management function entity through a network interface.

When the first management function entity is a location management function LMF entity, the processor is specifically configured to receive a positioning request message sent by the first management function entity through a newly added network interface.

Further, when the first management function entity is an access and mobility management function AMF entity or a mobility management entity MME, the processor is further configured to: before receiving the positioning request message sent by the first management function entity, send a first interface setting request message to the first management function entity through the transceiver; receive a first interface setting response message fed back by the first management function entity according to the first interface setting request message; wherein the first interface setting request message either explicitly or implicitly indicates that the access network node includes an LLMF entity; the first interface is an NG interface or an S1 interface.

When the first management function entity is a location management function LMF entity, the processor is further configured to: before receiving the positioning request message sent by the first management function entity, send a first interface setting request message to a second management function entity through the transceiver; and receive a first interface setting response message fed back by the second management function entity according to the first interface setting request message; wherein the second management function entity is an access and mobility management function AMF entity or a mobility management entity MME; the first interface setting request message explicitly or implicitly indicates that the access network node includes an LLMF entity; the first interface is an NG interface or an S1 interface.

Specifically, the indicating that the access network node includes an LLMF entity including at least one of the following conditions: carrying local positioning function indication information; carrying identity information of the LLMF; carrying IP address information of the LLMF; carrying the positioning capability information of the LLMF.

The implementation embodiments of the selection method of a location management function entity on the access network node side are all applicable to the embodiments of the access network node, and the same technical effect can also be achieved.

The embodiment of the present disclosure also provides a gateway mobile location center GMLC, which includes a memory, a processor, a transceiver, and a computer program stored on the memory and executed by the processor; the processor executes the program to implement the following steps: after receiving a UE context acquisition response message fed back by a unified data management UDM entity, sending a positioning request message to the first management function entity.

Wherein, the positioning request message includes an identifier of the target UE and a positioning quality of service QOS requirement.

After the gateway mobile location center GMLC provided by the embodiment of the present disclosure receives a UE context acquisition response message fed back by a unified data management UDM entity, a positioning request message is sent to the first management function entity. Wherein, the positioning request message includes an identifier of the target UE and a positioning quality of service QOS requirement, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Figure 15:
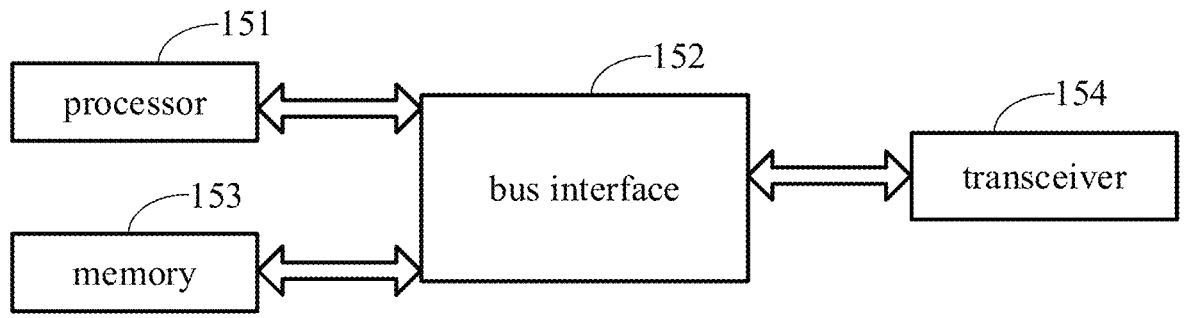
FIG. 15 is a schematic diagram of a gateway mobile location center GMLC according to an embodiment of the disclosure.

Specifically, as shown in FIG. 15, the gateway mobile location center GMLC of the embodiment of the present disclosure includes: a processor 151; and a memory 153 connected to the processor 151 through a bus interface 152, the memory 153 is used to store programs and data used by the processor 151 when performing operations, when the processor 151 calls and executes the programs and data stored in the memory 153, the following process is executed: after receiving a UE context acquisition response message fed back by a unified data management UDM entity through the transceiver 154, a positioning request message is sent to the first management function entity. Wherein, the positioning request message includes an identifier of the target UE and a positioning quality of service QOS requirement, The transceiver 154 is connected to the bus interface 152 and is used to receive and send data under the control of the processor 151.

It should be noted that, in FIG. 15, the bus architecture may include any number of interconnected buses and bridges. Specifically, various circuits of one or more processors represented by the processor 151 and the memory represented by the memory 153 are linked together. The bus architecture can also link various other circuits such as peripheral devices, voltage regulators, power management circuits, etc., which are all known in the art, and therefore, no further descriptions are provided herein. The bus interface provides the interface. The transceiver 154 may be a plurality of elements, that is, include a transmitter and a receiver, and provide a unit for communicating with various other devices on the transmission medium. The processor 151 is responsible for managing the bus architecture and general processing, and the memory 153 can store data used by the processor 151 when performing operations.

Those skilled in the art can understand that all or part of the steps in the above-mentioned embodiments can be implemented by hardware, or by a computer program to instruct relevant hardware. The computer program includes instructions for performing part or all of the steps of the above-mentioned method. The computer program can be stored in a readable storage medium, which can be any form of storage medium.

When the first management function entity is an access and mobility management function AMF entity or a mobility management entity MME, the processor is specifically configured to: receive a UE context acquisition response message fed back by the unified data management UDM entity, the UE context response message includes address information of the AMF entity or MIME; send a positioning request message to the AMF entity or MME according to the address information of the AMF entity or MME.

When the first management function entity is a location management function LMF entity, the processor is specifically configured to: receive the UE context acquisition response message fed back by the UDM entity, the UE context response message includes address information of the LMF entity and address information of the AMF entity or MME; and send a positioning request message to the LMF entity according to the address information of the LMF entity.

The implementation embodiments of the selection method of the location management function entity on the GMLC side are all applicable to the embodiments of the gateway mobile location center GMLC, and the same technical effect can also be achieved.

The embodiment of the present disclosure also provides a network storage function NRF entity, including a memory, a processor, a transceiver, and a computer program stored in the memory and executed by the processor; the processor executes the program to implement the following steps: confirming and accepting a registration process initiated by a first management function entity or a second management function entity, and registering network function NF configuration information of a local location management function LLMF.

The first management function entity is an access and mobility management function AMF entity or a mobility management entity MME.

The second management function entity is an access and mobility management function AMF entity or a mobility management entity MME.

The NF configuration information at least includes radio access network RAN identification information corresponding to the LLMF.

The network storage function NRF entity provided by the embodiment of the present disclosure confirms and accepts a registration process initiated by a first management function entity or a second management function entity, and registers network function NF configuration information of a local location management function LLMF. The first management function entity is an access and mobility management function AMF entity or a mobility management entity MME. The second management function entity is an access and mobility management function AMF entity or a mobility management entity MME. The NF configuration information at least includes radio access network RAN identification information corresponding to the LLMF, so as to ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Figure 16:
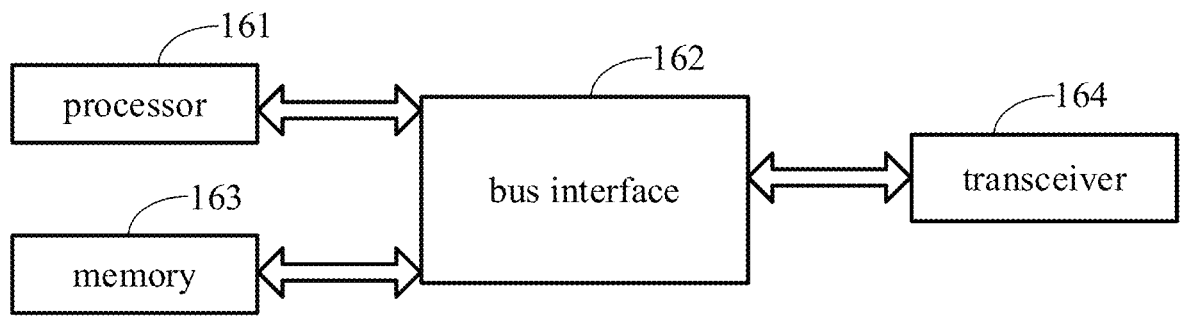
FIG. 16 is a schematic diagram of a network repository function NRF entity according to an embodiment of the disclosure.

Specifically, as shown in FIG. 16, the network storage function NRF entity of the embodiment of the present disclosure includes: a processor 161; and a memory 163 connected to the processor 161 through a bus interface 162, the memory 163 is used to store programs and data used by the processor 161 when performing operations, when the processor 161 calls and executes the programs and data stored in the memory 163, the following process is executed: confirming and accepting a registration process initiated by a first management function entity or a second management function entity, and registering network function NF configuration information of a local location management function LLMF.

The first management function entity is an access and mobility management function AMF entity or a mobility management entity MME.

The second management function entity is an access and mobility management function AMF entity or a mobility management entity MME.

The NF configuration information at least includes radio access network RAN identification information corresponding to the LLMF.

The network storage function NRF entity in the embodiment of the present disclosure may also include the transceiver 164, but it is not limited thereto.

The transceiver 164 is connected to the bus interface 162, and is used to receive and send data under the control of the processor 161.

It should be noted that in FIG. 16, the bus architecture may include any number of interconnected buses and bridges. Specifically, various circuits of one or more processors represented by the processor 161 and the memory represented by the memory 163 are linked together. The bus architecture can also link various other circuits such as peripheral devices, voltage regulators, power management circuits, etc., which are all known in the art, and therefore, no further descriptions are provided herein. The bus interface provides the interface. The transceiver 164 may be a plurality of elements, that is, including a transmitter and a receiver, and provide a unit for communicating with various other devices on the transmission medium. The processor 161 is responsible for managing the bus architecture and general processing, and the memory 163 can store data used by the processor 161 when performing operations.

Those skilled in the art can understand that all or part of the steps in the above-mentioned embodiments can be implemented by hardware, or by a computer program to instruct relevant hardware. The computer program includes instructions for performing part or all of the steps of the above-mentioned method. The computer program can be stored in a readable storage medium, which can be any form of storage medium.

Specifically, the RAN identification information includes at least one of the following information: identity of an access network node; IP address of the LLMF; and identification ID of the LLMF.

The implementation embodiments of the selection method of a location management function entity on the network storage function NRF entity side are all applicable to the embodiments of the network storage function NRF entity, and the same technical effect can also be achieved.

The embodiment of the present disclosure also provides a computer-readable storage medium on which a computer program is stored, and when the program is executed by a processor, the steps of the selection method of a location management function entity on the first management function entity side are realized; or when the program is executed by the processor, the steps of the selection method of a location management function entity on the second management function entity side are implemented; or when the program is executed by the processor, the steps of the selection method of a location management function entity on the access network node side are implemented; or when the program is executed by the processor, the steps of the selection method of a location management function entity on the GMLC side are implemented, or when the program is executed by the processor, the steps of the selection method of a location management function entity on the network storage function NRF entity side are implemented.

The implementation embodiment of the selection method of a location management function entity on the first management function entity side, the second management function entity side, the access network node side, the gateway mobile location center GMLC side, or the network storage function NRF entity side are all applicable to the embodiments of the computer-readable storage medium, and can also achieve the same corresponding technical effects.

Figure 17:
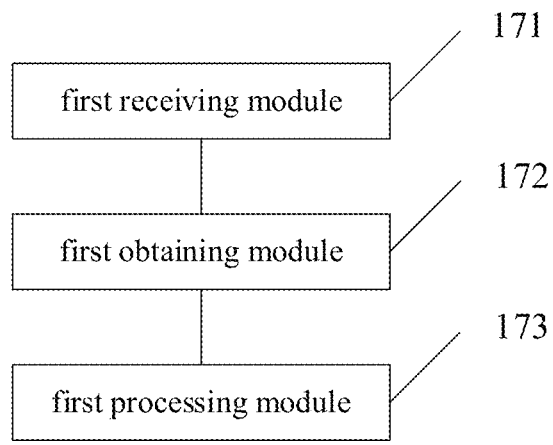
FIG. 17 is a schematic diagram of a selection device of a location management function entity according to an embodiment of the disclosure.

The embodiment of the present disclosure also provides a selection device of a location management functional entity, which is applied to the first management functional entity, as shown in FIG. 17, including: a first receiving module 171, configured to receive a positioning request message sent by a gateway mobile location center GMLC; the positioning request message including an identifier of a target UE and a positioning quality of service QOS requirement; a first obtaining module 172, configured to obtain information of a wireless access network where the target UE is located; and a first processing module 173, configured to select a target local location management function (LLMF) entity according to the information of the wireless access network where the target UE is located, the positioning QOS requirement, and pre-stored related information of the LLMF entity.

The selection device of a location management function entity provided by the embodiment of the present disclosure receives the positioning request message sent by the gateway mobile location center GMLC; the positioning request message includes an identifier of a target UE and a positioning quality of service QOS requirement; and obtains the information of a wireless access network where the target UE is located. A target local location management function (LLMF) entity is selected according to the information of the wireless access network where the target UE is located, the positioning QOS requirement, and pre-stored related information of the LLMF entity; so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

The pre-stored related information of the LLMF entity may be obtained by querying an NRF entity.

In the embodiment of the present disclosure, two specific examples are provided for the first management function entity, but they are not limited thereto.

In the first example, the first management function entity is an access and mobility management function AMF entity or a mobility management entity MME.

The first obtaining module includes: a first processing sub-module, configured to, if the target UE is in a disconnected state, initiate a service session process to the target UE according to an identifier of the target UE, so that the target UE enters a connected state, and information of the wireless access network where the target UE is located is obtained.

In the second example, the first management function entity is a location management function LMF entity.

The positioning request message also includes address information of the access and mobility management function AMF entity or the mobility management entity MME.

The first obtaining module includes: a first sending sub-module, configured to send an enable UE reachability request message to the AMF entity or MME according to the address information; the enable UE reachability request message carries the identifier of the target UE; a first receiving sub-module, configured to receive an enable UE reachability response message fed back by the AMF entity or MME according to the enable UE reachability request message; the enable UE reachability response message carries information of the wireless access network where the target UE is located.

The first processing module includes: a first querying sub-module, configured to query pre-stored related information of the LLMF entity from the unified data management UDM entity according to the information of the wireless access network where the target UE is located; and a second processing sub-module, configured to select the target LLMF entity according to the positioning QOS requirement and the queried pre-stored related information of the LLMF entity.

In the embodiment of the present disclosure, the selection device further includes: a first sending module, configured to s a positioning request message to an access network node including the target LLMF entity through the transceiver; and a second processing module, configured to receive a positioning result fed back by the access network node according to the positioning request message, and send the positioning result to the GMLC.

When the first management function entity is an access and mobility management function AMF entity or a mobility management entity MME, the first sending module includes: a second sending sub-module, configured to send the positioning request message to the access network node including the target LLMF entity via a network interface.

When the first management function entity is a location management function LMF entity, the first sending module includes: a third sending sub-module, configured to send the positioning request message to the access network node including the target LLMF entity through a newly added network interface.

On the basis of the above-mentioned first example (the first management function entity is the access and mobility management function AMF entity or the mobility management entity MME), in the solution provided by the embodiment of the present disclosure, the selection device further includes: a second receiving module, configured to, before selecting the target LLMF entity according to the information of the wireless access network where the target UE is located, the positioning QOS requirement, and the pre-stored related information of the LLMF entity, receive a first interface setting request message sent by the access network node; the first interface setting request message explicitly or implicitly indicates that the access network node includes an LLMF entity; and a third processing module, configured to store related information of the LLMF entity carried in the first interface setting request message; and feed back a first interface setting response message to the access network node according to the first interface setting request message. Wherein, the first interface is an NG interface or an S1 interface.

Further, the selection device further includes: a fourth processing module, configured to initiate a registration process for the network Repository function NRF entity, and notify the NRF entity of network function NF configuration information of the LLMF; wherein the NF configuration information at least includes radio access network RAN identification information corresponding to the LLMF.

Specifically, the RAN identification information includes at least one of the following information: the identity of the access network node; the IP address of the LLMF; and the identification ID of the LLMF.

In the embodiment of the present disclosure, the indicating that the access network node includes an LLMF entity including at least one of the following conditions: carrying local positioning function indication information; carrying identity information of the LLMF; carrying IP address information of the LLMF; carrying the positioning capability information of the LLMF.

The implementation embodiments of the selection method of a location management function entity on the first management function entity side are all applicable to the embodiments of the selection device of a location management function entity, and the same technical effect can also be achieved.

Figure 18:
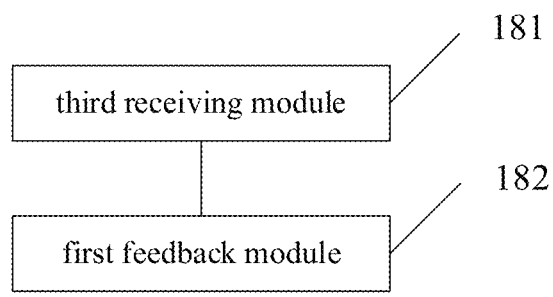
FIG. 18 is another schematic diagram of a selection device of a location management function entity according to an embodiment of the disclosure.

The embodiment of the present disclosure also provides a selection device of a location management function entity, which is applied to a second management function entity, and the second management function entity is an access and mobility management function AMF entity or a mobility management entity MME, as shown in FIG. 18, the selection device includes: a third receiving module 181, configured to receive an enable UE reachability request message sent by a first management function entity; the first management function entity is a location management function LMF entity; a first feedback module 182, configured to feed back an enable UE reachability response message to the first management function entity according to the enable UE reachability request message, and the enable UE reachability response message carries information of a wireless access network where a target terminal is located.

The selection device of the location management function entity provided by the embodiment of the present disclosure receives an enable UE reachability request message sent by a first management function entity; the first management function entity is a location management function LMF entity; and feeds back an enable UE reachability response message to the first management function entity according to the enable UE reachability request message, and the enable UE reachability response message carries information of a wireless access network where a target terminal is located; so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Wherein, the first feedback module includes: a third processing sub-module, configured to, if the target UE is in a disconnected state, initiate a service session process to the target UE according to an identifier of the target UE, so that the target UE enters a connected state, and information of the wireless access network where the target UE is located is obtained; and a first feedback sub-module, configured to feed back an enable UE reachability response message to the first management function entity according to the information of the wireless access network where the target UE is located.

Further, the selection device further includes: a fourth receiving module, configured to receive a first interface setting request message sent by the access network node; wherein the first interface setting request message either explicitly or implicitly indicates that the access network node includes an LLMF entity; and a fifth processing module, configured to store related information of the LLMF carried in the first interface setting request message, and feed back the first interface setting response message to the access network node according to the first interface setting request message; wherein, the first interface is an NG interface or an S1 interface.

Furthermore, the selection device further includes: a sixth processing module, configured to initiate a registration process for the network Repository function NRF entity, and notifying the NRF entity of network function NF configuration information of the LLMF; wherein the NF configuration information at least includes radio access network RAN identification information corresponding to the LLMF.

Specifically, the RAN identification information includes at least one of the following information: the identity of the access network node; the IP address of the LLMF; and the identification ID of the LLMF.

In the embodiment of the present disclosure, the indicating that the access network node includes an LLMF entity including at least one of the following conditions: carrying local positioning function indication information; carrying identity information of the LLMF; carrying IP address information of the LLMF; carrying the positioning capability information of the LLMF.

The implementation embodiments of the selection method of a location management function entity on the second management function entity side are all applicable to the embodiments of the selection device of a location management function entity, and the same technical effect can also be achieved.

Figure 19:
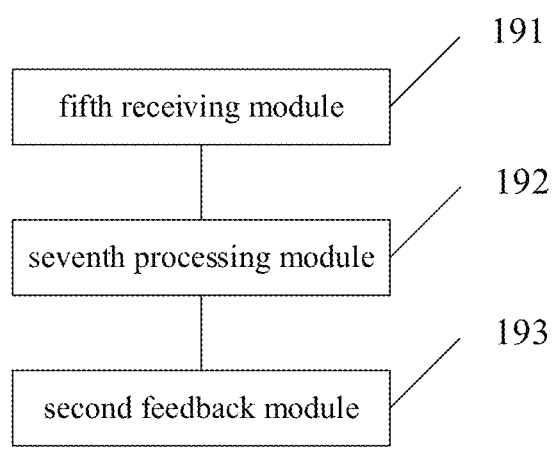
FIG. 19 is yet another schematic diagram of a selection device of a location management function entity according to an embodiment of the disclosure.

The embodiment of the present disclosure also provides a selection device of a location management function entity, which is applied to an access network node including a local location management function LLMF entity, as shown in FIG. 19, the selection device includes: a fifth receiving module 191, configured to receive a positioning request message sent by a first management function entity; a seventh processing module 192, configured to perform a positioning service according to the positioning request message to obtain a positioning result; and a second feedback module 193, configured to feed back the positioning result to the first management function entity.

The selection device of a location management function entity provided by the embodiment of the present disclosure receives a positioning request message sent by a first management function entity; performs a positioning service according to the positioning request message to obtain a positioning result; and feeds back the positioning result to the first management function entity; so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

When the first management function entity is an access and mobility management function AMF entity or a mobility management entity MME, the fifth receiving module includes: a second receiving sub-module, configured to receive the positioning request message sent by the first management function entity via a network interface.

When the first management function entity is a location management function LMF entity, the fifth receiving module includes: a third receiving sub-module, configured to receive the positioning request message sent by the first management function entity through a newly added network interface.

Further, when the first management function entity is an access and mobility management function AMF entity or a mobility management entity MME, the selection device further includes: a second sending module, configured to, before receiving the positioning request message sent by the first management function entity, send a first interface setting request message to the first management function entity; a sixth receiving module, configured to receive a first interface setting response message fed back by the first management function entity according to the first interface setting request message; wherein the first interface setting request message either explicitly or implicitly indicates that the access network node includes an LLMF entity; the first interface is an NG interface or an S1 interface.

When the first management function entity is a location management function LMF entity, the selection device further includes: a third sending module, configured to, before receiving the positioning request message sent by the first management function entity, send a first interface setting request message to a second management function entity; a seventh receiving module, configured to receive a first interface setting response message fed back by the second management function entity according to the first interface setting request message; wherein the second management function entity is an access and mobility management function AMF entity or a mobility management entity MME; the first interface setting request message explicitly or implicitly indicates that the access network node includes an LLMF entity; the first interface is an NG interface or an S1 interface.

Specifically, the indicating that the access network node includes an LLMF entity including at least one of the following conditions: carrying local positioning function indication information; carrying identity information of the LLMF; carrying IP address information of the LLMF; carrying the positioning capability information of the LLMF.

The implementation embodiments of the selection method of a location management function entity on the access network node side are all applicable to the embodiments of the selection device of a location management function entity, and the same technical effect can also be achieved.

Figure 20:
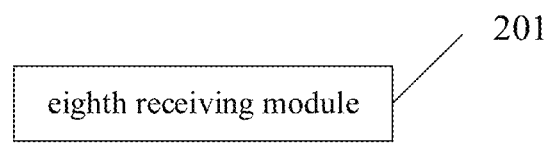
FIG. 20 is still yet another schematic diagram of a selection device of a location management function entity according to an embodiment of the disclosure.

The embodiment of the present disclosure also provides a selection device of a location management function entity, which is applied to a gateway mobile location center GMLC, as shown in FIG. 20, the selection device includes: an eighth receiving module 201, configured to, after receiving a UE context acquisition response message fed back by a unified data management UDM entity, send a positioning request message to the first management function entity.

Wherein, the positioning request message includes an identifier of the target UE and a positioning quality of service QOS requirement.

The selection device of a location management function entity provided by the embodiment of the present disclosure sends a positioning request message to the first management function entity after receiving a UE context acquisition response message fed back by a unified data management UDM entity. Wherein the positioning request message includes an identifier of the target UE and a positioning quality of service QOS requirement, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

When the first management function entity is an access and mobility management function AMF entity or a mobility management entity MME, the eighth receiving module includes: a fourth receiving sub-module, configured to receive a UE context acquisition response message fed back by the unified data management UDM entity, the UE context response message includes address information of the AMF entity or MME; and a fourth sending sub-module, configured to send a positioning request message to the AMF entity or MME according to the address information of the AMF entity or MME.

When the first management function entity is a location management function LMF entity, the eighth receiving module includes: a fifth receiving sub-module, configured to, after receiving the UE context acquisition response message fed back by the unified data management UDM entity, receive the UE context acquisition response message fed back by the UDM entity, the UE context response message includes address information of the LMF entity and address information of the AMF entity or MME; a fifth sending sub-module, configured to send a positioning request message to the LMF entity according to the address information of the LMF entity.

The implementation embodiments of the selection method of a location management function entity on the GMLC side are all applicable to the embodiments of the selection device of the location management function entity, and the same technical effect can also be achieved.

Figure 21:
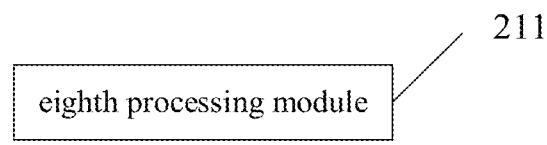
FIG. 21 is still yet another schematic diagram of a selection device of a location management function entity according to an embodiment of the disclosure.

The embodiment of the present disclosure also provides a selection device of a location management function entity, which is applied to a network storage function NRF entity, as shown in FIG. 21, the selection device includes: an eighth processing module 211, configured to confirm and accept a registration process initiated by a first management function entity or a second management function entity, and registering network function NF configuration information of a local location management function LLMF.

Wherein, the first management function entity is an access and mobility management function AMF entity or a mobility management entity MME; the second management function entity is an access and mobility management function AMF entity or a mobility management entity MME; the NF configuration information at least includes radio access network RAN identification information corresponding to the LLMF.

The selection device of the location management function entity provided by the embodiment of the present disclosure confirms and accepts a registration process initiated by a first management function entity or a second management function entity, and registering network function NF configuration information of a local location management function LLMF. Wherein the first management function entity is an access and mobility management function AMF entity or a mobility management entity MME; the second management function entity is an access and mobility management function AMF entity or a mobility management entity MME; the NF configuration information at least includes radio access network RAN identification information corresponding to the LLMF, so as ensure that under the local positioning network architecture, the local location management function entity can serve the core network in a better way, and a simple and efficient positioning service is provided to meet the high-precision and low-latency positioning requirements of the 5G positioning network architecture, thereby creating a higher commercial value.

Specifically, the RAN identification information includes at least one of the following information: identity of an access network node; IP address of the LLMF; and identification ID of the LLMF.

The implementation embodiments of the selection method of a location management function entity on the network storage function NRF entity side are all applicable to the embodiment of the selection device of a location management function entity, and the same technical effect can also be achieved.

It should be noted that many functional components described in this specification are referred to as modules/sub-modules, in order to emphasize the independence of their implementation modes more particularly.

In the embodiments of the present disclosure, the modules/sub-modules may be implemented by software so as to be executed by various types of processors. For example, an identified executable code module may include one or more physical or logical blocks of computer instructions, for example, it may be constructed as an object, process, or function. Nevertheless, the executable code of the identified module does not need to be physically located together, but can include different instructions stored in different bits. When these instructions are logically combined together, they constitute a module and implement the function of the module.

In fact, the executable code module may be a single instruction or many instructions, and may even be distributed on multiple different code segments, distributed in different programs, and distributed across multiple memory devices. Likewise, operating data can be identified within the module, and can be implemented in any suitable form and organized in any suitable type of data structure. The operating data may be collected as a single data set, or may be distributed in different locations (including on different storage devices), and may at least partly exist as electronic signals on the system or network.

When the module can be realized by software, considering the level of related hardware technology, the module can be realized by software. Without considering the cost, those skilled in the art can build the corresponding hardware circuit to realize the corresponding function. The hardware circuits include conventional very large-scale integrated (VLSI) circuits or gate arrays, and related semiconductors such as logic chips, transistors, or other discrete components. Modules can also be implemented with programmable hardware devices, such as field programmable gate arrays, programmable array logic, programmable logic devices, etc.

It can be understood that the embodiments of the present disclosure may be implemented by hardware, software, firmware, middleware, microcode, or a combination thereof. For hardware implementation, the processing unit can be implemented in one or more application specific integrated circuits (ASIC), digital signal processors (DSP), digital signal processing devices (DSP Device, DSPD), programmable Logic devices (PLD), Field-Programmable Gate Array (FPGA), general-purpose processors, controllers, microcontrollers, microprocessors, and other electronic units or combination thereof for performing the functions described in this disclosure.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or a part that contributes to the related art or a part of the technical solution can be embodied in the form of a software product. The computer software product is stored in a storage medium, including several instructions used to make a computer device (which may be a personal computer, a server, or a network device, etc.) execute all or part of the steps of the methods described in the various embodiments of the present disclosure. The aforementioned storage media includes: a U disk, a mobile hard disk, a read-only memory (ROM), a random access memory RAM), a magnetic disk or an optical disk and other media that can store program code.

The above descriptions merely describe optional implementations of the present disclosure. It is appreciated, modifications and improvements may be made by a person of ordinary skill in the art without departing from the principle of the present disclosure, and these modifications and improvements shall be deemed as falling within the scope of the present disclosure as well.

What is claimed is:

1. A selection method of a location management function entity, applied to a first management function entity, comprising:
   receiving a positioning request message sent by a gateway mobile location center (GMLC); the positioning request message including an identifier of a target user equipment (UE) and a positioning quality of service (QOS) requirement;
   obtaining information of a wireless access network where the target UE is located;
   selecting a target local location management function (LLMF) entity according to the information of the wireless access network where the target UE is located, the positioning QOS requirement, and pre-stored related information of the LLMF entity.

2. The selection method according to claim 1, wherein the pre-stored related information of the LLMF entity is obtained by querying a network repository function (NRF) entity.

3. The selection method according to claim 1, wherein the first management function entity is an access and mobility management function (AMF) entity or a mobility management entity (MME).

4. The selection method according to claim 3, wherein the obtaining information of the wireless access network where the target UE is located includes:
   if the target UE is in a disconnected state, initiating a service session process to the target UE according to an identifier of the target UE, so that the target UE enters a connected state, and the information of the wireless access network where the target UE is located is obtained.

5. The selection method according to claim 3, wherein before selecting the target LLMF entity according to the information of the wireless access network where the target UE is located, the positioning QOS requirement, and the pre-stored related information of the LLMF entity, the selection method further comprises:
   receiving a first interface setting request message sent by an access network node; wherein the first interface setting request message explicitly or implicitly indicates that the access network node includes the LLMF entity;

storing related information of the LLMF entity carried in the first interface setting request message; and feeding back a first interface setting response message to the access network node according to the first interface setting request message;

wherein the first interface is an NG interface or an S1 interface.

6. The selection method according to claim 5, wherein after feeding back the first interface setting response message to the access network node, the selection method further comprises:

initiating a registration process for a network repository function (NRF) entity, and notifying the NRF entity of network function (NF) configuration information of the LLMF entity;

wherein the NF configuration information at least includes radio access network (RAN) identification information corresponding to the LLMF entity.

7. The selection method according to claim 6, wherein the RAN identification information includes at least one of the following information:

identity of the access network node;
IP address of the LLMF entity;
identification ID of the LLMF entity.

8. The selection method according to claim 5, wherein the indicating that the access network node includes the LLMF entity includes at least one of the following conditions:

carrying local positioning function indication information;
carrying identity information of the LLMF entity;
carrying IP address information of the LLMF entity;
carrying positioning capability information of the LLMF entity.

9. The selection method according to claim 1, wherein the first management function entity is a location management function (LMF) entity.

10. The selection method according to claim 9, wherein the positioning request message further includes address information of the AMF entity or the MME;

the obtaining the information of the wireless access network where the target UE is located includes:
sending an enable UE reachability request message to the AMF entity or the MME according to the address information, wherein the enable UE reachability request message carries the identifier of the target UE;
receiving an enable UE reachability response message fed back by the AMF entity or the MME according to the enable UE reachability request message; wherein the enable UE reachability response message carries the information of the wireless access network where the target UE is located;
the selecting the target LLMF entity according to the information of the wireless access network where the target UE is located, the positioning QOS requirement, and the pre-stored related information of the LLMF entity includes:
querying the pre-stored related information of the LLMF entity from a unified data management (UDM) entity according to the information of the wireless access network where the target UE is located;
selecting the target LLMF entity according to the positioning QOS requirement and the queried pre-stored related information of the LLMF entity.

11. The selection method according to claim 1, wherein after selecting the target LLMF entity, the selection method further comprises:

sending a positioning request message to an access network node including the target LLMF entity;
receiving a positioning result fed back by the access network node according to the positioning request message, and sending the positioning result to the GMLC.

12. The selection method according to claim 11, wherein when the first management function entity is the AMF entity or the MME, the sending a positioning request message to the access network node including the target LLMF entity includes:

sending the positioning request message to the access network node including the target LLMF entity via a network interface.

13. The selection method according to claim 11, wherein when the first management function entity is a location management function (LMF) entity, the sending a positioning request message to the access network node including the target LLMF entity includes:

sending the positioning request message to the access network node including the target LLMF entity through a newly added network interface.

14. A selection method of a location management function entity, applied to a second management function entity, which is an access and mobility management function (AMF) entity or a mobility management entity (MME), comprising:

receiving an enable UE reachability request message sent by a first management function entity; wherein the first management function entity is a location management function (LMF) entity;
feeding back an enable UE reachability response message to the first management function entity according to the enable UE reachability request message, wherein the enable UE reachability response message carries information of a wireless access network where a target user equipment (UE) is located.

15. A selection method of a location management function entity, applied to an access network node including a local location management function (LLMF) entity, comprising:

receiving a positioning request message sent by a first management function entity;
performing a positioning service according to the positioning request message to obtain a positioning result;
feeding back the positioning result to the first management function entity;
wherein the LLMF entity is selected by the first management function entity according to the information of a wireless access network where a target UE is located, a positioning QOS requirement, and pre-stored related information of the LLMF entity.

16. The selection method according to claim 15, wherein when the first management function entity is an access and mobility management function (AMF) entity or a mobility management entity (MME), before receiving a positioning request message sent by the first management function entity, the selection method further includes:

sending a first interface setting request message to the first management function entity;
receiving a first interface setting response message fed back by the first management function entity according to the first interface setting request message;

wherein the first interface setting request message explicitly or implicitly indicates that the access network node includes the LLMF entity;

the first interface is an NG interface or an S1 interface.

17. The selection method according to claim 15, wherein when the first management function entity is the LMF entity, before receiving a positioning request message sent by the first management function entity, the selection method further includes:

sending a first interface setting request message to a second management function entity;

receiving a first interface setting response message fed back by the second management function entity according to the first interface setting request message;

wherein the second management function entity is an access and mobility management function (AMF) entity or a mobility management entity (MME);

the first interface setting request message explicitly or implicitly indicates that the access network node includes the LLMF entity;

the first interface is an NG interface or an S1 interface.

18. A first management function entity, comprising a memory, a processor, a transceiver, and a computer program stored in the memory and executed by the processor; wherein the processor executes the program to implement the steps of the selection method according to claim 1.

19. A second management function entity, comprising a memory, a processor, a transceiver, and a computer program stored in the memory and executed by the processor; the second management function entity is an access and mobility management function (AMF) entity or a mobility management entity (MME), wherein the processor executes the program to implement the steps of the selection method according to claim 14.

20. An access network node, comprising a local location management function (LLMF) entity including a memory, a processor, a transceiver, and a computer program stored on the memory and executed by the processor; the processor executes the program to implement the steps of the selection method according to claim 15.

* * * * *